United States Patent
Levitsky et al.

(10) Patent No.: US 12,120,050 B2
(45) Date of Patent: Oct. 15, 2024

(54) BLIND COMMON PHASE ERROR AND RESIDUAL CARRIER FREQUENCY OFFSET MITIGATION

(71) Applicant: QUALCOMM Incorporated, San Diego, CA (US)

(72) Inventors: Michael Levitsky, Rehovot (IL); Assaf Touboul, Netanya (IL); Lev Zavurov, Tel Aviv (IL); Daniel Paz, Geva Carmel (IL); Gideon Shlomo Kutz, Ramat Hasharon (IL)

(*) Notice: Subject to any disclaimer, the term of this patent is extended or adjusted under 35 U.S.C. 154(b) by 375 days.

(21) Appl. No.: 17/717,682

(22) Filed: Apr. 11, 2022

(65) Prior Publication Data

US 2023/0327829 A1    Oct. 12, 2023

(51) Int. Cl.
| | |
|---|---|
| *H04L 25/02* | (2006.01) |
| *H04L 5/00* | (2006.01) |
| *H04L 27/26* | (2006.01) |
| *H04W 72/1263* | (2023.01) |

(52) U.S. Cl.
CPC ........ *H04L 5/0048* (2013.01); *H04L 25/0238* (2013.01); *H04L 27/2601* (2013.01); *H04W 72/1263* (2013.01)

(58) Field of Classification Search
None
See application file for complete search history.

(56) References Cited

U.S. PATENT DOCUMENTS

| | | | | |
|---|---|---|---|---|
| 10,218,549 | B1* | 2/2019 | Löhning | H04L 7/00 |
| 2018/0287759 | A1* | 10/2018 | Kundargi | H04W 56/0035 |
| 2019/0053072 | A1* | 2/2019 | Kundargi | H04W 16/28 |
| 2019/0132828 | A1* | 5/2019 | Kundargi | H04B 17/318 |
| 2020/0145161 | A1 | 5/2020 | Lee et al. | |
| 2022/0385419 | A1* | 12/2022 | Paz | H04W 72/02 |

OTHER PUBLICATIONS

International Search Report and Written Opinion—PCT/US2023/064764—ISA/EPO—Jun. 23, 2023.
National Instruments: "Discussion on Explicit and Implicit Signaling for PT-RS", 3GPP TSG RAN WG1 Meeting #89, R1-1708272, 3rd Generation Partnership Project, Mobile Competence Centre, 650, Route Des Lucioles, F-06921 Sophia-Antipolis Cedex, France, vol. RAN WG1, No. Hangzhou, P.R. of China, May 15, 2017-May 19, 2017, 11 Pages, May 14, 2017, XP051273465, Sec 1, p. 2, Sec 2, p. 6-p. 7, Sec.3.2, Sec.3.1.

* cited by examiner

*Primary Examiner* — Kenny S Lin

(57) ABSTRACT

Methods, systems, and devices for wireless communications are described. The described techniques support blind common phase error (CPE) and residual carrier frequency offset mitigation. Generally, the described techniques provide for blind CPE mitigation at a receiving device without a phase tracking reference signal (PTRS) associated with less overhead and improved performance as compared to use of a PTRS to mitigate CPE. A receiving device may receive a shared channel message in a scheduled shared channel allocation in accordance with a PTRS configuration that omits a PTRS allocation based on a capability of the receiving device to apply blind CPE mitigation for shared channel receptions. In some examples, with a single DMRS symbol allocation, blind CPE mitigation for each subsequent data symbol of a shared channel message may be based on the blind CPE estimation for the previous symbol, which may enable robust mitigation of a residual carrier frequency offset.

30 Claims, 19 Drawing Sheets

BLIND COMMON PHASE ERROR AND RESIDUAL CARRIER FREQUENCY OFFSET MITIGATION

FIELD OF TECHNOLOGY

The following relates to wireless communications, including blind common phase error and residual carrier frequency offset mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support blind common phase error (CPE) and residual carrier frequency offset (CFO) mitigation. Generally, the described techniques provide for blind CPE mitigation at a receiving device without a phase tracking reference signal (PTRS) that is associated with less overhead and improved performance as compared to use of a PTRS to mitigate CPE. For example, for downlink transmissions, a network device (e.g., a base station) may transmit, to a user equipment (UE) control signaling indicating parameters for a PTRS configuration for a downlink shared channel reception, the parameters indicating to the UE that the PTRS configuration omits a PTRS transmission, for example based on a capability of the UE to apply blind CPE mitigation.

The UE may receive, from the network device, a downlink shared channel allocation without a PTRS. The UE may receive a downlink shared channel message in the downlink shared channel allocation in accordance with the parameters. For example, the UE may receive the downlink shared channel message conveyed by the downlink shared channel allocation based on applying blind CPE mitigation as a part of a downlink shared channel allocation demodulation process. In some examples, where a single demodulation reference signal (DMRS) symbol allocation is used blind CPE mitigation for each orthogonal frequency-division multiplexing (OFDM) data symbol may be based on the blind CPE estimation for the adjacent in time OFDM data symbol which is closer in time to a DMRS symbol of the downlink shared channel allocation, where the blind estimation process starts with OFDM data symbols adjacent to DMRS symbol. This progressive blind CPE mitigation process may allow for a robust blind residual intra slot CFO mitigation. In some examples, the UE may transmit a message to the network device indicating the capability of the UE to apply blind CPE mitigation. In some examples, the capability message may implicitly indicate a capability of the UE to perform blind CPE mitigation, for example by indicating modulation and coding scheme indices or allocation bandwidth thresholds related to PTRS configuration indicating to the network device to not use a PTRS for shared channel allocations.

For uplink communications, the network device may transmit an uplink shared channel allocation for transmitting an uplink shared channel message and control signaling indicating to omit transmission of a PTRS in the uplink shared channel allocation. The network device may receive the uplink shared channel message in the uplink shared channel allocation in accordance with a PTRS configuration that omits a PTRS, for example, based on a capability of the network device to apply blind CPE mitigation for uplink shared channel receptions. For example, the network device may receive the uplink shared channel message conveyed by the uplink shared channel allocation based on applying the blind CPE mitigation as a part of an uplink shared channel allocation demodulation process. In some examples where a single DMRS symbol allocation is used, blind CPE mitigation for each OFDM data symbol may be based on the blind CPE estimation for the adjacent in time OFDM data symbol which is closer in time to a DMRS symbol of the uplink shared channel allocation, where the blind estimation process starts with OFDM data symbols adjacent to DMRS symbol. This progressive blind CPE mitigation process may allow for a robust blind residual intra slot CFO mitigation.

A method for wireless communications at a user equipment (UE) is described. The method may include receiving, from a network device, control signaling indicating parameters for a phase tracking reference signal configuration for a downlink shared channel reception, the parameters indicating to the UE that the phase tracking reference signal configuration omits a phase tracking reference signal based on a capability of the UE to apply blind common phase error mitigation for downlink shared channel receptions and receiving, from the network device, control information scheduling a downlink shared channel allocation without a phase tracking reference signal.

An apparatus for wireless communications at a UE is described. The apparatus may include a processor, memory coupled with the processor, and instructions stored in the memory. The instructions may be executable by the processor to cause the apparatus to receive, from a network device, control signaling indicating parameters for a phase tracking reference signal configuration for a downlink shared channel reception, the parameters indicating to the UE that the phase tracking reference signal configuration omits a phase tracking reference signal based on a capability of the UE to apply blind common phase error mitigation for downlink shared channel receptions and receive, from the network device, control information scheduling a downlink shared channel allocation without a phase tracking reference signal.

Another apparatus for wireless communications at a UE is described. The apparatus may include means for receiving, from a network device, control signaling indicating parameters for a phase tracking reference signal configuration for a downlink shared channel reception, the parameters indicating to the UE that the phase tracking reference signal configuration omits a phase tracking reference signal based on a capability of the UE to apply blind common phase error mitigation for downlink shared channel receptions and means for receiving, from the network device, control information scheduling a downlink shared channel allocation without a phase tracking reference signal.

A non-transitory computer-readable medium storing code for wireless communications at a UE is described. The code may include instructions executable by a processor to receive, from a network device, control signaling indicating parameters for a phase tracking reference signal configuration for a downlink shared channel reception, the parameters indicating to the UE that the phase tracking reference signal configuration omits a phase tracking reference signal based on a capability of the UE to apply blind common phase error mitigation for downlink shared channel receptions and receive, from the network device, control information scheduling a downlink shared channel allocation without a phase tracking reference signal.

In some examples of the method, apparatuses, and non-transitory computer-readable medium described herein, receiving the control signaling may include operations, features, means, or instructions for receiving the control signaling via a radio resource control message.

Some examples of the method, apparatuses, and non-transitory computer-readable medium described herein may further include operations, features, means, or instructions for receiving a downlink shared channel message in the downlink shared channel allocation in accordance with the parameters.

In some examples of the method, apparatuses, and non-transitory computer-readable medium described herein, receiving the downlink shared channel message may include operations, features, means, or instructions for receiving the downlink shared channel message conveyed by the downlink shared channel allocation based on applying the blind common phase error mitigation as a part of a downlink shared channel allocation demodulation process.

In some examples of the method, apparatuses, and non-transitory computer-readable medium described herein, applying the blind common phase error mitigation may include operations, features, means, or instructions for determining a blind common phase error estimation and applying a blind common phase error correction based on the blind common phase error estimation.

Some examples of the method, apparatuses, and non-transitory computer-readable medium described herein may further include operations, features, means, or instructions for receiving, with the control information, scheduling information for a set of downlink shared channel allocations associated with a set of component carriers and without a phase tracking reference signal, where the downlink shared channel allocation may be associated with a first component carrier and receiving a set of downlink shared channel messages transmitted simultaneously with the downlink shared channel message via the set of downlink shared channel allocations associated with the set of component carriers based on the determined blind common phase error estimation for the downlink shared channel message.

In some examples of the method, apparatuses, and non-transitory computer-readable medium described herein, receiving the downlink shared channel message may include operations, features, means, or instructions for receiving a set of multiple orthogonal frequency-division multiplexing symbols in the downlink shared channel allocation including a single demodulation reference signal and a set of orthogonal frequency-division multiplexing data symbols.

In some examples of the method, apparatuses, and non-transitory computer-readable medium described herein, receiving the downlink shared channel message may include operations, features, means, or instructions for applying a first common phase error mitigation to a first orthogonal frequency-division multiplexing data symbol of the set of orthogonal frequency-division multiplexing data symbols, where the first orthogonal frequency-division multiplexing data symbol includes a nearest orthogonal frequency-division multiplexing data symbol to the single demodulation reference signal and demodulating the first orthogonal frequency-division multiplexing data symbol of the set of orthogonal frequency-division multiplexing data symbols based on the first common phase error mitigation.

In some examples of the method, apparatuses, and non-transitory computer-readable medium described herein, receiving the downlink shared channel message may include operations, features, means, or instructions for applying a second common phase error mitigation to a second orthogonal frequency-division multiplexing data symbol of the set of orthogonal frequency-division multiplexing data symbols based on a common phase error estimation of the first orthogonal frequency-division multiplexing data symbol, the second orthogonal frequency-division multiplexing data symbol adjacent in time to the first orthogonal frequency-division multiplexing data symbol and demodulating the second orthogonal frequency-division multiplexing data symbol of the set of orthogonal frequency-division multiplexing data symbols based on the second common phase error mitigation.

In some examples of the method, apparatuses, and non-transitory computer-readable medium described herein, receiving the downlink shared channel message may include operations, features, means, or instructions for receiving the set of multiple orthogonal frequency-division multiplexing symbols in the downlink shared channel allocation with an unknown residual carrier frequency offset.

In some examples of the method, apparatuses, and non-transitory computer-readable medium described herein, the downlink shared channel message includes one of a frequency range one cellular cell message or a frequency range two or above cellular cell message.

In some examples of the method, apparatuses, and non-transitory computer-readable medium described herein, the downlink shared channel message includes a frequency range two or above cellular message.

Some examples of the method, apparatuses, and non-transitory computer-readable medium described herein may further include operations, features, means, or instructions for transmitting, to the network device, a control message indicating the capability of the UE to apply blind common phase error estimation.

In some examples of the method, apparatuses, and non-transitory computer-readable medium described herein, transmitting the control message may include operations, features, means, or instructions for transmitting, with the control message, a first indication of one or more phase tracking reference signal related modulation and coding scheme threshold indices for the downlink shared channel allocation and a second indication of one or more phase tracking reference signal related bandwidth thresholds for the downlink shared channel allocation.

A method for wireless communications at a network device is described. The method may include transmitting, to a UE, control information scheduling an uplink shared channel allocation for transmitting an uplink shared channel message, transmitting, to the UE, control signaling indicating to omit transmission of a phase tracking reference signal in the uplink shared channel allocation, and receiving the uplink shared channel message in the uplink shared channel allocation in accordance with a phase tracking reference signal configuration that omits a phase tracking reference signal based on a capability of the network device to apply blind common phase error mitigation for uplink shared channel receptions.

An apparatus for wireless communications at a network device is described. The apparatus may include a processor, memory coupled with the processor, and instructions stored in the memory. The instructions may be executable by the processor to cause the apparatus to transmit, to a UE, control information scheduling an uplink shared channel allocation for transmitting an uplink shared channel message, transmit, to the UE, control signaling indicating to omit transmission of a phase tracking reference signal in the uplink shared channel allocation, and receive the uplink shared channel message in the uplink shared channel allocation in accordance with a phase tracking reference signal configuration that omits a phase tracking reference signal based on a capability of the network device to apply blind common phase error mitigation for uplink shared channel receptions.

Another apparatus for wireless communications at a network device is described. The apparatus may include means for transmitting, to a UE, control information scheduling an uplink shared channel allocation for transmitting an uplink shared channel message, means for transmitting, to the UE, control signaling indicating to omit transmission of a phase tracking reference signal in the uplink shared channel allocation, and means for receiving the uplink shared channel message in the uplink shared channel allocation in accordance with a phase tracking reference signal configuration that omits a phase tracking reference signal based on a capability of the network device to apply blind common phase error mitigation for uplink shared channel receptions.

A non-transitory computer-readable medium storing code for wireless communications at a network device is described. The code may include instructions executable by a processor to transmit, to a UE, control information scheduling an uplink shared channel allocation for transmitting an uplink shared channel message, transmit, to the UE, control signaling indicating to omit transmission of a phase tracking reference signal in the uplink shared channel allocation, and receive the uplink shared channel message in the uplink shared channel allocation in accordance with a phase tracking reference signal configuration that omits a phase tracking reference signal based on a capability of the network device to apply blind common phase error mitigation for uplink shared channel receptions.

In some examples of the method, apparatuses, and non-transitory computer-readable medium described herein, receiving the uplink shared channel message may include operations, features, means, or instructions for receiving the uplink shared channel message conveyed by the uplink shared channel allocation based on applying the blind common phase error mitigation as a part of an uplink shared channel allocation demodulation process.

In some examples of the method, apparatuses, and non-transitory computer-readable medium described herein, applying the blind common phase error mitigation may include operations, features, means, or instructions for determining a blind common phase error estimation and applying a blind common phase error correction based on the blind common phase error estimation.

Some examples of the method, apparatuses, and non-transitory computer-readable medium described herein may further include operations, features, means, or instructions for transmitting, with the control information, scheduling information for a set of uplink shared channel allocations associated with a set of component carriers and without a phase tracking reference signal, where the uplink shared channel allocation may be associated with a first component carrier and receiving a set of uplink shared channel messages transmitted simultaneously with the uplink shared channel message via the set of uplink shared channel allocations associated with the set of component carriers based on the determined blind common phase error estimation for the uplink shared channel message.

In some examples of the method, apparatuses, and non-transitory computer-readable medium described herein, receiving the uplink shared channel message may include operations, features, means, or instructions for receiving a set of multiple orthogonal frequency-division multiplexing symbols in the uplink shared channel allocation including a single demodulation reference signal and a set of orthogonal frequency-division multiplexing data symbols.

In some examples of the method, apparatuses, and non-transitory computer-readable medium described herein, receiving the uplink shared channel message may include operations, features, means, or instructions for applying a first common phase error mitigation to a first orthogonal frequency-division multiplexing data symbol of the set of orthogonal frequency-division multiplexing data symbols, where the first orthogonal frequency-division multiplexing data symbol includes a nearest orthogonal frequency-division multiplexing data symbol to the single demodulation reference signal and demodulating the first orthogonal frequency-division multiplexing data symbol of the set of orthogonal frequency-division multiplexing data symbols based on the first common phase error mitigation.

In some examples of the method, apparatuses, and non-transitory computer-readable medium described herein, receiving the uplink shared channel message may include operations, features, means, or instructions for applying a second common phase error mitigation to a second orthogonal frequency-division multiplexing data symbol of the set of orthogonal frequency-division multiplexing data symbols based on the first common phase error mitigation of the first orthogonal frequency-division multiplexing data symbol, the second orthogonal frequency-division multiplexing data symbol adjacent in time to the first orthogonal frequency-division multiplexing data symbol and demodulating the second orthogonal frequency-division multiplexing data symbol of the set of orthogonal frequency-division multiplexing data symbols based on the second common phase error mitigation.

In some examples of the method, apparatuses, and non-transitory computer-readable medium described herein, receiving the uplink shared channel message may include operations, features, means, or instructions for receiving the set of multiple orthogonal frequency-division multiplexing symbols in the uplink shared channel allocation with an unknown carrier frequency offset.

In some examples of the method, apparatuses, and non-transitory computer-readable medium described herein, the uplink shared channel message includes one of a frequency range one cellular cell message or a frequency range two or above cellular cell message.

In some examples of the method, apparatuses, and non-transitory computer-readable medium described herein, the uplink shared channel message includes a frequency range two or above cellular message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
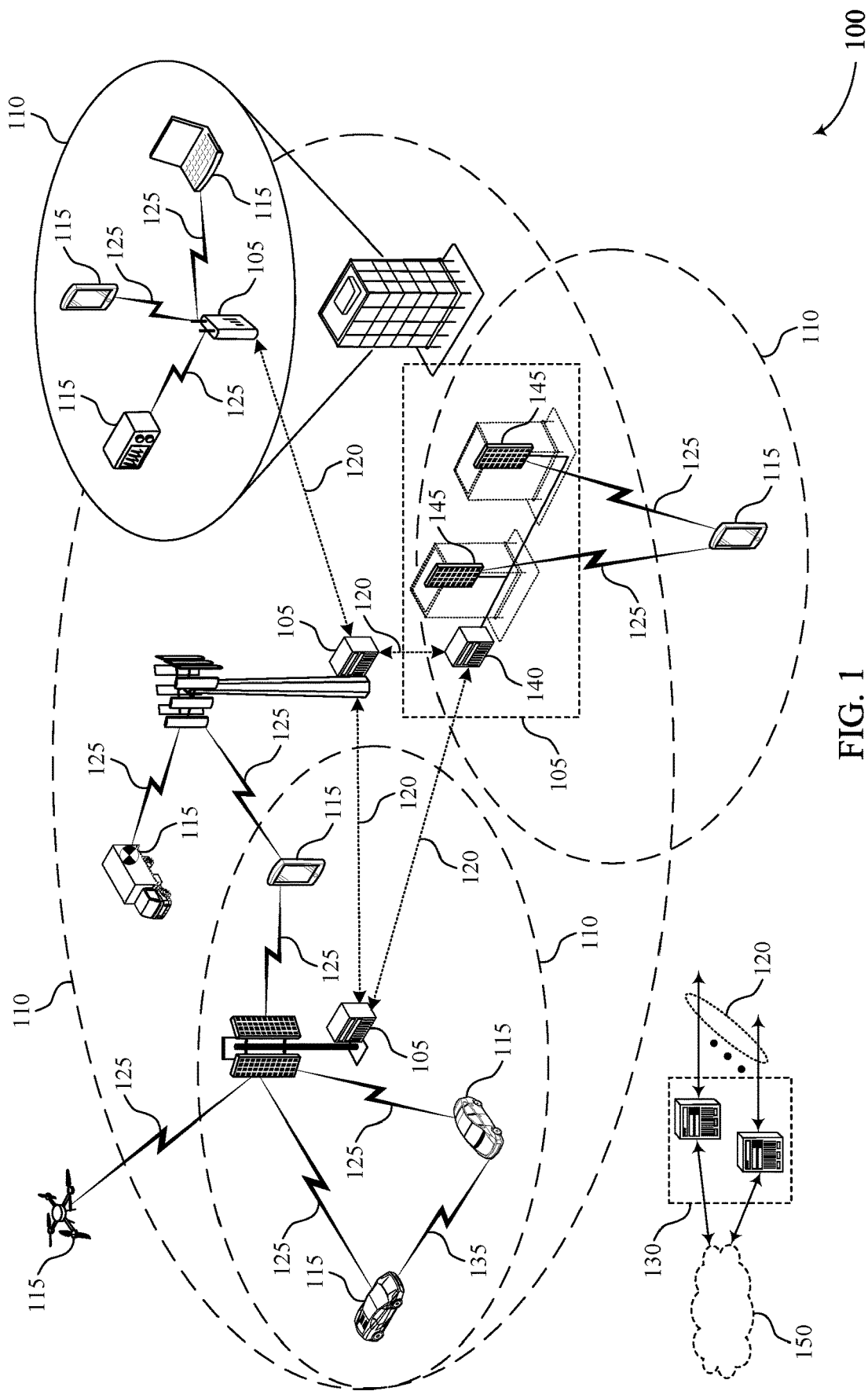
FIG. 1 illustrates an example of a wireless communications system that supports blind common phase error (CPE) and residual carrier frequency offset (CFO) mitigation in accordance with aspects of the present disclosure.

In wireless communications systems, common phase error (CPE) caused by phase noise may limit the achievable data throughput, especially for frequency range 2 (FR2) and higher frequency bands in middle to high signal to noise ratios (SNRs) and for middle to high modulation and coding schemes (MCSs). A phase tracking reference signal (PTRS) may be used to mitigate CPE. PTRSs may be configured with a density based on an MCS and bandwidth of the data allocations. A high configured PTRS density may enable a receiving device (e.g., a user equipment (UE)) to correct CPE with a better accuracy. For example, a UE may correct for CPE on every received symbol (e.g., every physical downlink shared channel (PDSCH) symbol). PTRSs may also enable a receiving device to correct for residual intra slot frequency error. Meaningful residual intra slot frequency error which impacts data demodulation and decoding perforce may be relevant for lower frequency bands as well and not only for FR2 and above and especially for scenarios where a single demodulation reference signal (DMRS) symbol is transmitted per data allocation which does not allow to estimate (and correct) any existing frequency error per allocation based on DMRS. High PTRS density may be associated with relatively high resource overhead (e.g., a maximum PTRS density may consume around 4% of the total data resource elements). PTRS may also increase the effective code rate as PTRS resource elements are rate matched, which may degrade the achievable performance per MCS from the transmitter side.

The present disclosure relates to blind CPE mitigation at a receiving device without a PTRS transmission that may be associated with less overhead and improved data reception performance as compared to use of a PTRS to mitigate CPE. For example, for downlink transmissions, a network device (e.g., a base station) may transmit, to a UE, control signaling indicating parameters for a PTRS configuration for a downlink shared channel reception, the parameters indicating to the UE that the PTRS configuration omits a PTRS transmission, for example based on a capability of the UE to apply blind CPE mitigation (PTRS less data reception for any MCS or PDSCH allocation bandwidth scenario). The UE may receive, from the network device, a downlink shared channel allocation without a PTRS. The UE may demodulate and decode a downlink shared channel message in the downlink shared channel allocation in accordance with the parameters. For example, the UE may receive the downlink shared channel message conveyed by the downlink shared channel allocation based on applying blind CPE mitigation as a part of a downlink shared channel allocation demodulation process. In some examples where a single DMRS symbol allocation is used, blind CPE mitigation for each orthogonal frequency-division multiplexing (OFDM) data symbol may be based on the blind CPE estimation for the adjacent in time OFDM data symbol which is closer in time to a DMRS symbol of the uplink shared channel allocation, where the blind estimation process starts with OFDM data symbols adjacent to DMRS symbol. This progressive blind CPE mitigation process may allow for a robust blind residual intra slot CFO mitigation. In some examples, the UE may transmit a message to the network device indicating the capability of the UE to apply blind CPE mitigation. In some examples, the capability message may implicitly indicate a capability of the UE to perform blind CPE mitigation, for example by indicating modulation and coding scheme indices or allocation bandwidth thresholds indicating to the network device to not use a PTRS for shared channel allocation.

For uplink communications, the network device may transmit control signaling indicating to a UE to omit transmission of a PTRS in the uplink shared channel. Correspondingly, a scheduled physical uplink shared channel (PUSCH) allocation may be transmitted by the UE without a PTRS in this scenario. The network device may receive the uplink shared channel message in the uplink shared channel allocation in accordance with a PTRS configuration that omits a PTRS, for example, based on a capability of the network device to apply blind CPE mitigation for uplink shared channel receptions. For example, the network device may receive the uplink shared channel message conveyed by the uplink shared channel allocation based on applying the blind CPE mitigation as a part of an uplink shared channel allocation demodulation process. In some examples where a single DMRS symbol allocation is used, blind CPE mitigation for each OFDM data symbol may be based on the blind CPE estimation for the adjacent in time OFDM data symbol which is closer in time to a DMRS symbol of the uplink shared channel allocation, where the blind estimation process starts with OFDM data symbols adjacent to DMRS symbol. This progressive blind CPE mitigation process may allow for a robust blind residual intra slot CFO mitigation.

Aspects of the disclosure are initially described in the context of wireless communications systems. Aspects of the disclosure are further illustrated by and described with reference to blind CPE mitigation schemes, shared channel allocations, and process flows. Aspects of the disclosure are further illustrated by and described with reference to apparatus diagrams, system diagrams, and flowcharts that relate to blind CPE and residual CFO mitigation.

FIG. 1 illustrates an example of a wireless communications system 100 that supports blind CPE and residual CFO mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., network devices such as network nodes, core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 25, 40, 50, 80, 100, 200, or 400 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

Thus, as described herein, a base station 105 may include one or more components that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated base station). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

Deployment of communication systems, such as 5G new radio (NR) systems, may be arranged in multiple manners with various components or constituent parts. In a 5G NR system, or network, a network node, a network entity, a mobility element of a network, a RAN node, a core network node, a network element, or a network equipment, such as a base station 105, or one or more units (or one or more components) performing base station functionality, may be implemented in an aggregated or disaggregated architecture. For example, a base station 105 (such as a Node B (NB), evolved NB (eNB), NR base station, 5G NB, gNodeB (gNB), access point (AP), a transmit receive point (TRP), or a cell, etc.) may be implemented as an aggregated base station 105 (also known as a standalone base station 105 or a monolithic base station 105) or a disaggregated base station 105.

An aggregated base station 105 may be configured to utilize a radio protocol stack that is physically or logically integrated within a single RAN node. A disaggregated base station 105 may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations 105 may be utilized in an IAB network, an O-RAN (such as the network configuration sponsored by the O-RAN Alliance), or a VRAN, also known as a cloud radio access network (C-RAN). Disaggregation may include distributing functionality across two or more units at various physical locations, as well as distributing functionality for at least one unit virtually, which can enable flexibility in network design. The various units of the disaggregated base station 105, or disaggregated RAN architecture, can be configured for wired or wireless communication with at least one other unit.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

CPE caused by phase noise may limit the achievable data throughput for communications between a base station 105 and a UE 115, especially for FR2 and higher frequency bands in middle to high SNRs and for middle to high MCSs. CPE may occur per OFDM symbol, and may result in a maximum MCS limitation and create a flooring effect for an achievable throughput for communication as well as degrade achievable throughput at middle to high SNRs if not mitigated. CPE distribution may be a function of phase noise characteristics on the transmitter and receiver sides. In some cases, CPE can reach 3 degrees and even higher per OFDM symbol. Intercarrier interference (ICI) may be a function of a phase noise mask or shape and the integrated phase noise power. Integrated phase noise power may typically be around 30-33 dBc, meaning that integrated phase noise power starts to impact throughput for SNR approaching 30 dB but may be negligible for SNR below 20 db. Current PTRS mapping for CP-OFDM waveform (distributed in frequency) may not enable ICI mitigation.

A PTRS may be used to mitigate CPE. PTRS may be configured with a density based on an MCS and bandwidth of the data signals. For example, PTRS may be mapped with a time density ($L_{PTRS}$) while DMRS symbols may be skipped, where time density $L_{PTRS}$ may indicate spacing in terms of OFDM symbols between data OFDM symbols that are allocated with PTRS resource elements (Res). Table 1 below illustrates an example set of configurable PTRS time densities ($L_{PTRS}$) as a function of a scheduled MCS ($I_{MCS}$). In some examples, the MCS thresholds (e.g., ptrs-$MCS_1$, ptrs-$MCS_2$, ptrs-$MCS_3$, and ptrs-$MCS_4$) may be configured by the network (e.g., a serving base station 105) and signaled to a UE 115. In some examples, the MCS thresholds may be signaled and conferred per band and/or per subcarrier spacing. In some examples, the MCS thresholds may be configured in memory of the UE 115 (e.g., may be standardized). In some examples, no PTRS may be configured for all MCSs (e.g., if all MCS thresholds or at least ptrs-$MCS_1$ is defined as equal to MCS index=29).

TABLE 1

| Scheduled MCS | Time Density ($L_{PTRS}$) |
|---|---|
| $I_{MCS}$ < ptrs-$MCS_1$ | PTRS Not Present |
| ptrs-$MCS_1$ ≤ $I_{MCS}$ ≤ ptrs-$MCS_2$ | 4 |
| ptrs-$MCS_2$ ≤ $I_{MCS}$ ≤ ptrs-$MCS_3$ | 2 |
| ptrs-$MCS_3$ ≤ $I_{MCS}$ ≤ ptrs-$MCS_4$ | 1 |

In some examples, PTRS may be mapped with a corresponding frequency grid. For example, PTRS frequency density ($K_{PTRS}$) may be based on the scheduled allocation bandwidth ($N_{RB}$). Table 2 below illustrates an example set of configurable PTRS frequency densities ($K_{PTRS}$) as a function of a scheduled bandwidth ($N_{RB}$), where frequency density $L_{PTRS}$ may refer to a number of data RBs allocated with a single PTRS resource elements. In some examples, the bandwidth thresholds (e.g., $N_{RB0}$ and $N_{RB1}$) may be configured by the network (e.g., a serving base station 105) and signaled to a UE 115. In some examples, the bandwidth thresholds may be configured in memory of the UE 115 (e.g., may be standardized). A UE 115 may signal bandwidth preferences to the serving base station 105 corresponding to a UE capability to perform CPE mitigation with a given PTRS density per band and per subcarrier spacing.

TABLE 2

| Scheduled Bandwidth | Frequency Density ($K_{PTRS}$) |
|---|---|
| $N_{RB}$ < $N_{RB0}$ | PTRS Not Present |
| $N_{RB0}$ ≤ $N_{RB}$ ≤ $N_{RB1}$ | 4 |
| $N_{RB1}$ ≤ $N_{RB}$ | 2 |

An example PTRS configuration may include a single PTRS port, with one PTRS resource element per 2 resource blocks and one OFDM symbol carrying PTRS REs every second OFDM symbol, and 2 DMRS symbols (e.g., type 2, with a single DMRS symbol per DMRS location). An example maximum PTRS configuration may include $L_{PTRS}$=1 meaning PTRS is allocated on every data OFDM symbol and $K_{PTRS}$=2. In the example maximum PTRS configuration, a maximum percentage of PTRS resource elements in the PDSCH allocation may be approximately 4% of the data resource elements when the PTRS is configured at a maximum density and with a single port.

A high configured PTRS density in time and frequency may enable a receiving device (e.g., a UE 115) to correct CPE on every data OFDM symbol and with a sufficient accuracy. For example, the UE 115 may correct for CPE on every received symbol (e.g., every PDSCH symbol). Accordingly, high configured PTRS densities may commonly be used in wireless communications. PTRSs may also enable a receiving device to correct for residual intra slot frequency error (e.g., in mmW communications because 1 DMRS symbol may typically be used for a PDSCH allocation). High PTRS density may be associated with relatively high resource overhead (e.g., a maximum PTRS density with a single PTRS port may consume 4% of the total data resource elements, and with a second PTRS port for relevant scenarios, PTRS may consume 8% of the total data resource elements). PTRS may also increase the effective code rate per MCS (e.g., as a function of PTRS overhead) which may degrade decoding robustness per MCS. The related throughput degradation may reach up to 2 dB depending on MCS and channel type and may be expected for a wide range of SNR (e.g., SNR>0).

The present disclosure relates to blind CPE mitigation at a receiving device without a PTRS that is associated with less overhead and corresponding to an improved performance as compared to use of a PTRS to mitigate CPE. For example, the possible throughput improvement with respect to a blind CPE mitigation as compared to a scenario with PTRS allocation may correlate to the degradation caused by the increase in the effective code rate per MCS caused by PTRS (e.g., up to 2 dB for some channel types and MCS range). The disclosed blind CPE mitigation may mitigate a large range of phase error deviations and may also address intra slot residual CFO.

For example, for downlink transmissions, a base station may transmit, to a UE 115, control signaling indicating parameters for a PTRS configuration for a downlink shared channel reception, the parameters indicating to the UE 115 that the PTRS configuration omits a PTRS transmission, for example based on a capability of the UE 115 to apply blind CPE mitigation. The UE 115 may receive, from the base station 105, a downlink shared channel allocation without a PTRS. The UE 115 may receive a downlink shared channel message in the downlink shared channel allocation in accordance with the parameters. For example, the UE 115 may receive the downlink shared channel message conveyed by the downlink shared channel allocation based on applying blind CPE mitigation as a part of a downlink shared channel allocation demodulation process. In some examples where a single DMRS symbol allocation is used, blind CPE mitigation for each OFDM data symbol may be based on the blind CPE estimation for the adjacent in time OFDM data symbol which is closer in time to a DMRS symbol of the uplink shared channel allocation, where the blind estimation process starts with OFDM data symbols adjacent to DMRS symbol. This progressive blind CPE mitigation process may allow for a robust blind residual intra slot CFO mitigation. In some examples, the UE 115 may transmit a message to the base station 105 indicating the capability of the UE 115 to apply blind CPE mitigation. In some examples, the capability message may implicitly indicate a capability of the UE 115 to perform blind CPE mitigation, for example by indicating modulation and coding scheme indices or bandwidth thresholds indicating to the base station 105 to not use a PTRS for a given shared channel allocation.

For uplink communications, the base station 105 may transmit control signaling indicating to omit transmission of a PTRS in the uplink shared channel. Correspondingly, a scheduled PUSCH allocation may be transmitted by the UE without a PTRS. The base station 105 may receive the uplink shared channel message in the uplink shared channel allocation in accordance with a PTRS configuration that omits a PTRS transmission, for example, based on a capability of the base station 105 to apply blind CPE mitigation for uplink shared channel receptions. For example, the base station 105 may receive the uplink shared channel message conveyed by the uplink shared channel allocation based on applying the blind CPE mitigation as a part of an uplink shared channel allocation demodulation process. In some examples, where a single DMRS symbol allocation is used, blind CPE mitigation for each OFDM data symbol may be based on the blind CPE estimation for the adjacent in time OFDM data symbol which is closer in time to a DMRS symbol of the uplink shared channel allocation, where the blind estimation process starts with OFDM data symbols adjacent to DMRS symbol. This progressive blind CPE mitigation process may allow for a robust blind residual intra slot CFO mitigation.

Blind CPE mitigation may be applicable for single or multi panel transmission and/or reception, and may be applicable for single transmission and reception point (TRP) scenarios or multi-TRP scenarios (e.g., for space division multiplexing, time division multiplexing, or frequency division multiplexing).

Unknown residual CFO may result in linearly increasing phase offset not captured in channel estimation as a function of time distance from the DMRS symbol (e.g., OFDM symbol index offset relative to the DMRS symbol). In the case of more than a single DMRS symbol, the residual CFO may be estimated and corrected based on DMRS. In the case of a single DMRS symbol, CFO may conventionally be mitigated based on a PTRS. If a PTRS is not allocated, as in the case of the disclosed blind CPE mitigation process, the blind CPE may account for CFO, for example, a highly robust (from the maximum CFO range perspective) residual CFO mitigation can be achieved by applying blind CPE mitigation to each OFDM symbol and basing the blind CPE estimation for each subsequent OFDM symbol in time (e.g., further away in time from the DMRS symbol) among the rest on the CPE estimation result for the previous OFDM symbol to define the relevant possible CPE values range for the current OFDM symbol. Failure to mitigate residual CFO, especially at worst case residual CFO, may introduce severe performance degradation. Blind residual CFO mitigation (e.g., without a PTRS), may be beneficial for positive SNR range and any corresponding MCS option to this SNR range. Blind residual CFO mitigation may be performed for frequency range 1 (FR1) transmission (with a single DMRS (where PTRS is not used), which may be configured for customer premise equipment or integrated access and backhaul node scenarios with a non-mobile link (e.g., which may reach very high MCS and may be sensitive to non-corrected CPE or residual CFO).

The blind residual CFO mitigation in the case of a single DMRS and no PTRS configuration may be applicable for FR1, FR2, and above. The blind residual CFO mitigation in the case of a single DMRS and no PTRS configuration may be applicable for frequency tracking loop (FTL) transient or convergence periods (e.g., after beam switches, after discontinuous reception, after handover, after an overheating even, or after phase loop lock reconfigurations). In some examples, the blind residual CFO mitigation in the case of a single DMRS and no PTRS configuration may be applicable for proprietary links with non-reasonably low periodicity of synchronization signal blocks (SSB) or tracking reference signals (TRS) (e.g., an insufficient FTL loop tracking accuracy may be compensated by intra slot residual CFO mitigation), or for low cost receivers or for satellite links without global navigation satellite system.

The disclosed blind residual CFO and CPE mitigation may increase robustness for CFO and FTL transients including for the low SNR region with a wide range of phase deviations that may be mitigated. The disclosed blind residual CFO and CPE mitigation may enable high performance with low cost hardware even with poor phase noise characteristics and non-stable phase lock loops or reference signals. The disclosed blind residual CFO and CPE mitigation may enable lower SSB periodicity, or TRS periodicity, or both.

Figure 2:
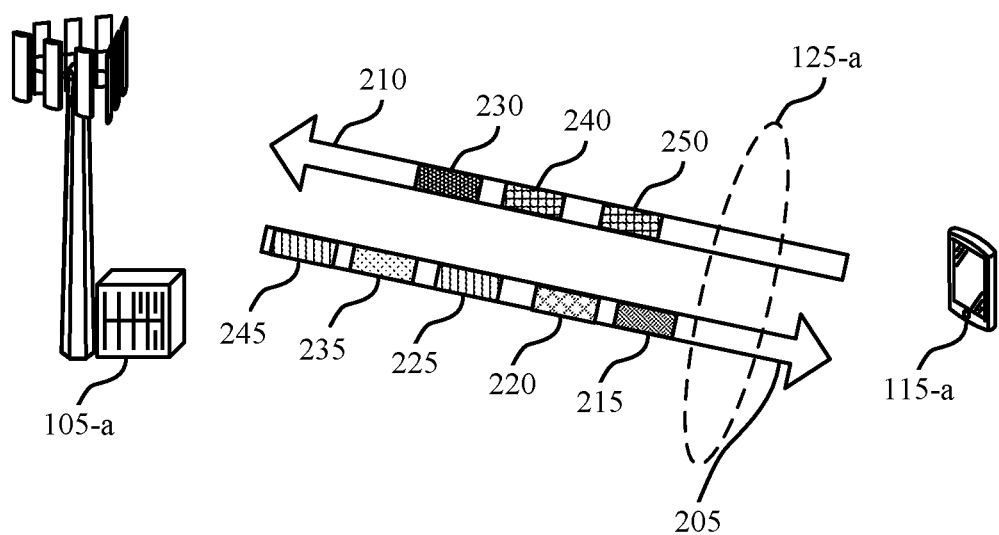
FIG. 2 illustrates an example of a wireless communications system that supports blind CPE and residual CFO mitigation in accordance with aspects of the present disclosure.

FIG. 2 illustrates an example of a wireless communications system 200 that supports blind CPE and residual CFO mitigation in accordance with aspects of the present disclosure. In some examples, the wireless communications system 200 may implement aspects of wireless communications system 100. The wireless communications system 200 may include a UE 115-*a* which may be an example of a UE 115 as described herein. The wireless communications system 200 may include a network device 105-*a*, which may be an example of a base station 105 as described herein.

The UE 115-*a* may communicate with the network device 105-*a* using a communication link 125-*a*, which may be an example of an NR or LTE link between the UE 115-*a* and the network device 105-*a*. The communication link 125-*a* may include bi-directional links that enable both uplink and downlink communication. For example, the communication link 125-*a* may include a downlink communication link 205 and an uplink communication link 210. For example, the UE 115-*a* may transmit uplink signals, such as uplink control signals or uplink data signals, to the network device 105-*a* using the uplink communication link 210 and the network device 105-*a* may transmit downlink transmissions, such as downlink control signals or downlink data signals, to the UE 115-*a* using the downlink communication link 205.

The UE 115-*a* and the network device 105-*a* may transmit or receive shared channel messages without a PTRS, for example using a blind CPE mitigation. For example, for downlink communications, the UE 115-*a* may receive, from the network device 105-*a*, control signaling 215 indicating parameters for a PTRS configuration for a downlink shared channel reception, the parameters indicating to the UE 115-*a* that the PTRS configuration omits a PTRS based on a capability of the UE 115-*a* to apply blind CPE mitigation for downlink shared channel receptions. In some examples, the network device 105-*a* may transmit the control signaling 215 via an RRC message. In some examples, the UE 115-*a* may transmit, to the network device 105-*a*, a control message 230 implicitly indicating the capability of the UE to apply blind CPE mitigation, and in response, the network device 105-*a* may transmit the control signaling 215. In some examples, the UE 115-*a* may transmit, with the control message 230, a first indication of one or more PTRS related MCS threshold indices for the downlink shared channel allocation and a second indication of one or more PTRS related bandwidth thresholds for the downlink shared channel allocation.

The UE 115-a may receive, from the network device 105-a, control information 220 scheduling a downlink shared channel allocation.

The UE 115-a may receive, from the network device 105-a, a downlink shared channel message 225 in the downlink shared channel allocation. The UE 115-a may receive the downlink shared channel message 225 without PTRS REs in the downlink shared channel allocation in accordance with the parameters. In some examples, receiving the downlink shared channel message 225 conveyed via the downlink shared channel allocation may include applying the blind CPE mitigation and using the blind CPE mitigation to demodulate the downlink shared channel message 225. In some examples, applying the blind CPE mitigation may include determining a blind CPE estimation and applying a CPE correction based on the blind CPE estimation.

In some examples, the UE 115-a may receive, from the network device 105-a, scheduling information 220 for a set of downlink shared channel allocations associated with a set of component carriers and without a PTRS transmission as a part of PDSCH, where the downlink shared channel allocation is associated with a first component carrier. The UE 115-a may receive a set of downlink shared channel messages 245 transmitted simultaneously with the downlink shared channel message 225 via the set of downlink shared channel allocations associated with the set of component carriers based on the determined blind CPE estimation for the downlink shared channel message 225.

In some examples, receiving the downlink shared channel message 225 includes receiving a set of OFDM symbols contained in the downlink shared channel allocation including a single demodulation reference signal symbol and a set of OFDM data symbols. In some examples, receiving the downlink shared channel message 225 may include: applying a first CPE mitigation to a first OFDM data symbol of the set of OFDM data symbols, where the first OFDM data symbol may be a nearest OFDM data symbol to the single demodulation reference signal; and demodulating the first OFDM data symbol of the set of OFDM data symbols based at least in part on the first CPE mitigation. In some examples, receiving the downlink shared channel message 225 may further include: applying a second CPE mitigation to a second OFDM data symbol of the set of OFDM data symbols based at least in part on a CPE estimation of the first OFDM data symbol, the second OFDM data symbol adjacent in time to the first OFDM data symbol; and demodulating the second OFDM data symbol of the set of OFDM data symbols based on the second CPE mitigation. Accordingly, with such a progressive approach for CPE mitigation, the UE 115-a may mitigate residual CFO in the downlink shared channel message 225 with very high robustness (e.g., may support a very wide range for residual CFO values with a limited blind estimation complexity). In some examples, UE 115-a may receive the set of OFDM symbols in the downlink shared channel allocation with an unknown residual CFO that can get a relatively high value (for the applicable numerology).

As another example, for uplink communications, the UE 115-a may receive, from the network device 105-a, control information 235 scheduling an uplink shared channel allocation for transmitting an uplink shared channel message 240.

The UE 115-a may receive, from the network device 105-a, control signaling 215 indicating to omit transmission of a PTRS in the uplink shared channel allocation.

The network device 105-a may receive, from the UE 115-a, the uplink shared channel message 240 in the uplink shared channel allocation in accordance with a PTRS configuration that omits a PTRS based at least in part on a capability of the network device to apply blind CPE mitigation for uplink shared channel receptions.

In some examples, receiving the uplink shared channel message 240 conveyed via the uplink shared channel allocation may include applying the blind CPE mitigation and using the blind CPE mitigation to demodulate the uplink shared channel message 240. In some examples, applying the blind CPE mitigation may include determining a blind CPE estimation and applying a CPE correction based on the blind CPE estimation.

In some examples, the UE 115-a may receive, from the network device 105-a, scheduling information for a set of uplink shared channel allocations associated with a set of component carriers and without a PTRS, where the uplink shared channel allocation is associated with a first component carrier. The network device 105-a may receive a set of uplink shared channel messages 250 transmitted simultaneously with the uplink shared channel message 240 via the set of uplink shared channel allocations associated with the set of component carriers based on the determined blind CPE estimation for the uplink shared channel message 240.

Figure 3:
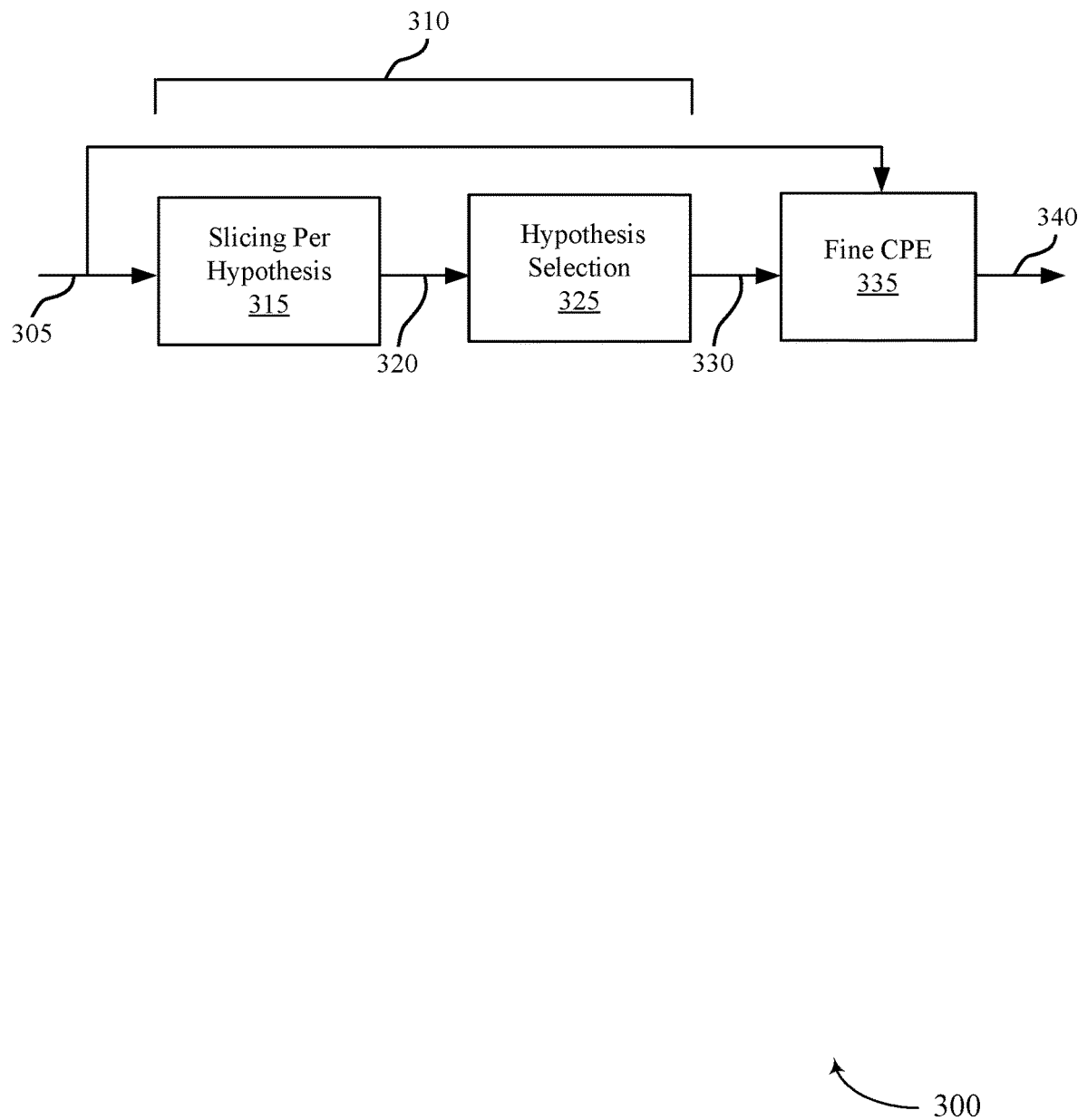
FIG. 3 illustrates an example of a blind CPE mitigation scheme that supports blind CPE and residual CFO mitigation in accordance with aspects of the present disclosure.

In some examples, receiving the uplink shared channel message 240 includes receiving a set of OFDM symbols in the uplink shared channel allocation including a single demodulation reference signal symbol and a set of OFDM data symbols. In some examples, receiving the uplink shared channel message 240 may include: applying a first CPE mitigation to a first OFDM data symbol of the set of OFDM data symbols, where the first OFDM data symbol may be a nearest OFDM data symbol to the single demodulation reference signal; and demodulating the first OFDM data symbol of the set of OFDM data symbols based at least in part on the first CPE mitigation. In some examples, receiving the uplink shared channel message 240 may further include: applying a second CPE mitigation to a second OFDM data symbol of the set of OFDM data symbols based on a CPE estimation of the first OFDM data symbol, the second OFDM data symbol adjacent in time to the first OFDM data symbol; and demodulating the second OFDM data symbol of the set of OFDM data symbols based on the second CPE mitigation. Accordingly, the network device 105-a may mitigate residual CFO in the uplink shared channel message 240. In some examples, network device 105-a may receive the set of OFDM symbols in the uplink shared channel allocation with an unknown residual CFO FIG. 3 illustrates an example of a blind CPE mitigation scheme 300 that supports blind CPE and residual CFO mitigation in accordance with aspects of the present disclosure. The blind CPE mitigation scheme 300 may be implemented by aspects of wireless communications systems 100 or 200.

Blind CPE estimation may be performed on soft OFDM symbols, after minimum mean squared error (MMSE) equalization, using the modeling shown in equation 1 below. In equation 1, k refers to a resource element index, where k is $\in [1, K_{alloc}]$, l—layer index. In equation 1, m refers to a PDSCH OFDM symbol index (excluding DMRS symbols), s(k, m, l) refers to the transmitted symbol, $\theta_{CPE}(m)$ refers to the CPE per OFDM symbol, and n(k, m, l) refers to the post equalization noise.

$$x(k,m,l)=s(k,m,l)e^{j*\theta_{CPE}(m)}+n(k,m,l) \quad (1)$$

The blind CPE mitigation scheme 300 may include a coarse CPE estimation step 310 and a fine CPE estimation step 335. The coarse CPE estimation step 310 may be based on CPE hypothesis detection and may include a slicing operation per tested CPE hypothesis step 315 and a CPE hypothesis selection step 325 (comprising the coarse CPE estimation). The coarse CPE estimation step 310 may be performed on a subset of resource elements $K_{CPE} \leq K_{alloc}$ without a meaningful performance degradation. In some examples, the hypothesis selection of the coarse CPE estimation step 310 may be a machine learning style hypothesis detection. The input 305 to the slicing per hypothesis step 315 may be a demodulated symbol obtained at the MMSE equalization out. The slicing per hypothesis step 315 may also calculate an average slicing error per hypothesis ($\overline{err}(\theta_{hyp})$) which may be the output 320 of the slicing per hypothesis step 315. At slicing per hypothesis step 315, for the corresponding quadrature amplitude modulation (QAM) constellation rotated by $e^{j*\theta_{hyp}}$) may be used as a basis for the slicing operation, and the sliced symbols may be determined based on MAP detection as follows:

$$\check{s}(\theta_{hyp}, k, m, l) = \underset{s_p}{\operatorname{argmin}} \|x(k, m, l) - s_p e^{j*\theta_{hyp}}\|$$

where $s_p$-QAM symbols, $\theta_{hyp}$-coarse CPE hyphotesis ($N_\theta$ options). The coarse hypothesis range $\theta_{hyp}=[-\theta_{CPEmax}:\Delta\theta_{hyp}:+\Delta\theta_{CPEmax}]$, where $-\theta_{CPEmax}$ may be based on a worst case phase noise mask assumption and on an upper bound of a residual CFO.

At the hypothesis selection step 325, the hypothesis $\hat{\theta}_{hyp}$ 330 may be selected according to equation 2 below.

$$\hat{\theta}_{hyp}(m) = \underset{\theta_{hyp}}{\operatorname{argmin}} \left( \sum_{k=1:K_{CPE}} \sum_l \|x(k, m, l) - \check{s}(\theta_{hyp}, k, m, l)e^{j*\theta_{hyp}}\| \right) = \quad (2)$$

$$\underset{\theta_{hyp}}{\operatorname{argmin}(\overline{err}(\theta_{hyp}))}$$

Given the hypothesis $\hat{\theta}_{hyp}$ 330, the fine CPE estimation step 335 may be performed based on equation 3 below.

$$\hat{\theta}_{CPE}(m) = \operatorname{angle}(\Sigma_{k=1}^{k=K_{CPE}} \Sigma_l x(k,m,l)*\operatorname{conj}(\check{s}(\hat{\theta}_{hyp},k,m,l))) \quad (3)$$

The output 340 of the fine CPE estimation step 335 may be the CPE estimation $\hat{\theta}_{CPE}(m)$ for the OFDM symbol m, which may be used to mitigate the CPE on this OFDM symbol.

The coarse CPE estimation step 310 may involve Euclidian distance calculations for several rotated constellation hypotheses. In some examples, rotated constellation hypotheses may be precomputed and stored in memory of the receiving device (e.g., of a UE 115 or a base station 105). The fine CPE estimation step 335 may be performed for a selected coarse hypothesis, and may be similar to a PTRS based estimation. In some examples, a fractional portion of the allocated shared channel resource elements ($K_{CPE}$) may be used for the blind estimation (for both the fine and the coarse estimation steps to achieve good performance. As described herein, blind CPE mitigation may be performed for FR1 communications (e.g., narrowband FR1 allocation scenarios with single DMRS symbol configuration and with a significant residual CFO) or mmW communications (e.g., for mitigation of CPE related to phase noise and a residual CFO where a wideband allocation may be typically used).

In some examples, a sparse grid of coarse CPE hypotheses (e.g., $\Delta\theta_{hyp}=4°$ or 5°) may be used without significantly degrading the overall blind CPE estimation accuracy for most MCSs. A maximum range of CPE hypotheses to be addressed per shared channel allocation may be defined mostly by the residual CFO. For example, phase noise related CPE with a standard deviation of 3 degrees (which may be a rather pessimistic scenario for FR2) may be responsible for approximately a +/−9 degree range per OFDM symbol, and a residual CFO of 500 Hz (which may be reasonable for FR2) may add an additional +/−16 degree range of gradually aggregated bias (e.g., increasing with time distance from a DMRS symbol).

Figure 4:
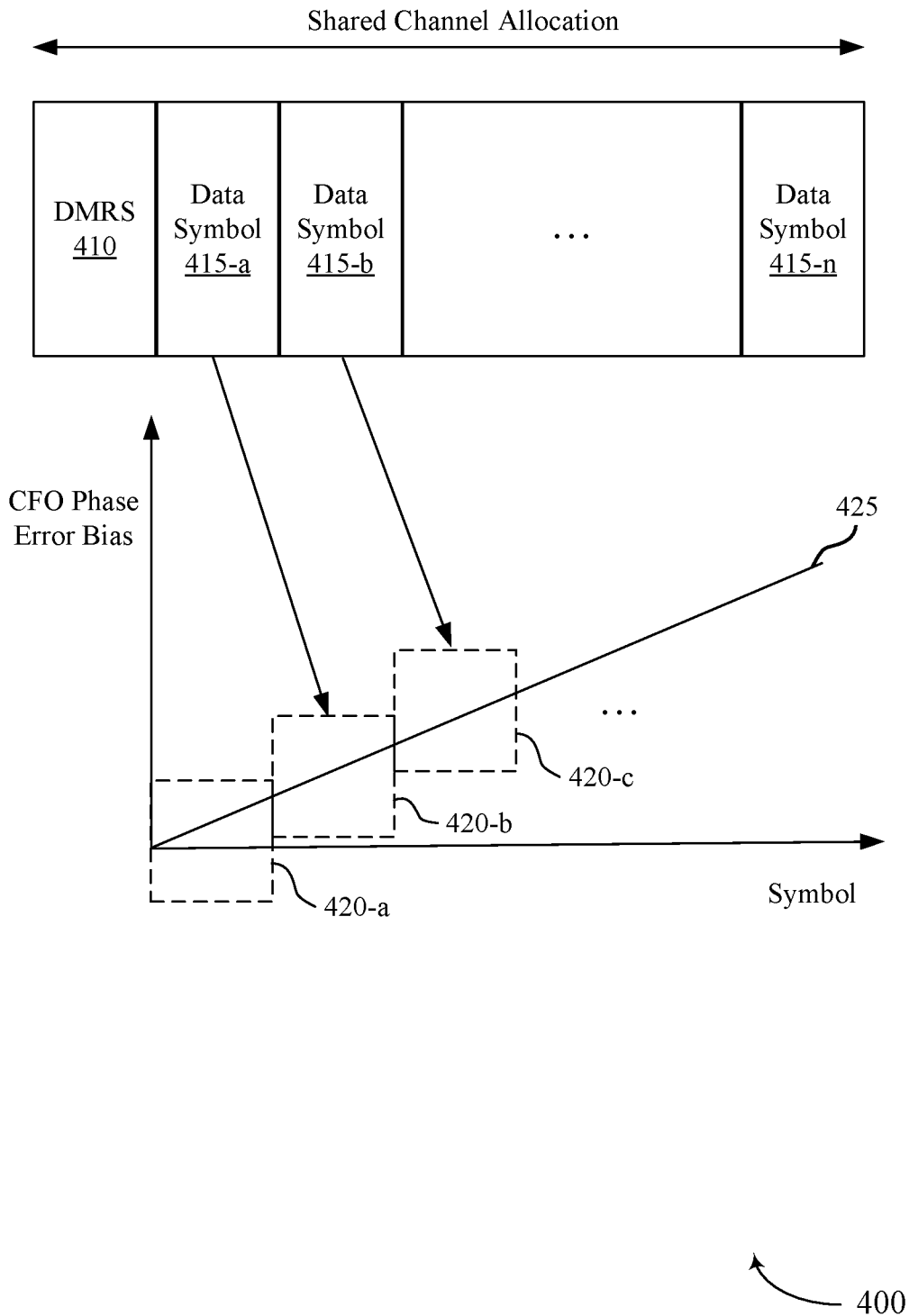
FIG. 4 illustrates an example of a shared channel allocation that supports blind CPE and residual CFO mitigation in accordance with aspects of the present disclosure.

FIG. 4 illustrates an example of a shared channel allocation 400 that supports blind CPE and residual CFO mitigation in accordance with aspects of the present disclosure. The shared channel allocation 400 may be implemented by aspects of wireless communications systems 100 or 200.

As discussed herein, a residual CFO may result in a cumulative CPE 425 which will linearly increase with time distance from a DMRS symbol 410. For example, for the OFDM data symbol 415-a closest to the DMRS symbol 410, the CPE hypothesis range 420-a may be centered at 0 degrees, and for the second OFDM data symbol 415-b, the CPE hypothesis range 420-b may be centered at more than 0 degrees, and a CPE hypothesis range 420-c for a subsequent OFDM symbol may be centered at more than the CPE hypothesis range 420-b. To mitigate linearly increasing CPE 425 related to a residual CFO in a robust way and with a limited blind CPE mitigation complexity, the blind CPE mitigation may include progressive hypothesis range selection per OFDM data symbol 415 as the blind CPE mitigation process is applied to subsequent OFDM symbols. In other words, the fine CPE estimation for each OFDM symbol 415 may be used as a starting point for the course hypothesis detection of the subsequent OFDM symbol 415. For example, the fine CPE estimation for the OFDM data symbol 415-a may be used for the coarse hypothesis selection step (e.g., for the coarse CPE hypotheses range determination) for the second OFDM data symbol 415-b. Correspondingly, approximately only 5 coarse CPE hypotheses may be used per OFDM symbol (even at a worst case assumption for phase noise and residual CFO). Accordingly, if the hypothesis for the OFDM data symbol 415-a is given by $$\theta_{hyp_1} = \left[ -\theta_{CPE_{max\_per\_symb}} : \Delta\theta_{hyp} : +\theta_{CPE_{max\_per\_symb}} \right],$$

then the hypothesis for a subsequent symbol 415-n is given by $$\theta_{hyp_n} = \left[ -\theta_{CPE_{max\_per\_symb}} + \hat{\theta}_{CPE}(n-1) : \Delta\theta_{hyp} : \theta_{CPE_{max\_per\_symb}} + \hat{\theta}_{CPE}(n-1) \right].$$

In some examples, the shared channel allocation may include allocations on multiple component carriers. Blind CPE estimation may be performed on a single component carrier. The receiving device may mitigate CPE across all of the corresponding to the scheduled allocations' component carriers based on the blind CPE estimation on the single component carrier (e.g., as phase noise impairment may be the same on all of the allocated component carriers and as residual CFO impacts all of the component carriers in the same way in terms of the corresponding phase drift). This may reduce blind CPE mitigation complexity in the addressed scenario. In some examples, the number of resource elements ($K_{CPE}$) (and the coarse CPE hypothesis grid resolution (: $\Delta\theta_{hyp}$) to be used for the blind CPE estimation may be adaptive or assumed based on a performance and complexity trade off.

The disclosed blind residual CFO and CPE mitigation may involve relatively low complexity (e.g., sparse hypothesis grid, a narrow band estimation, an estimation on a single component carrier may be applied to multiple component carriers, progressive hypothesis range determination, and adaptive parameterization per MCS).

Figure 5:
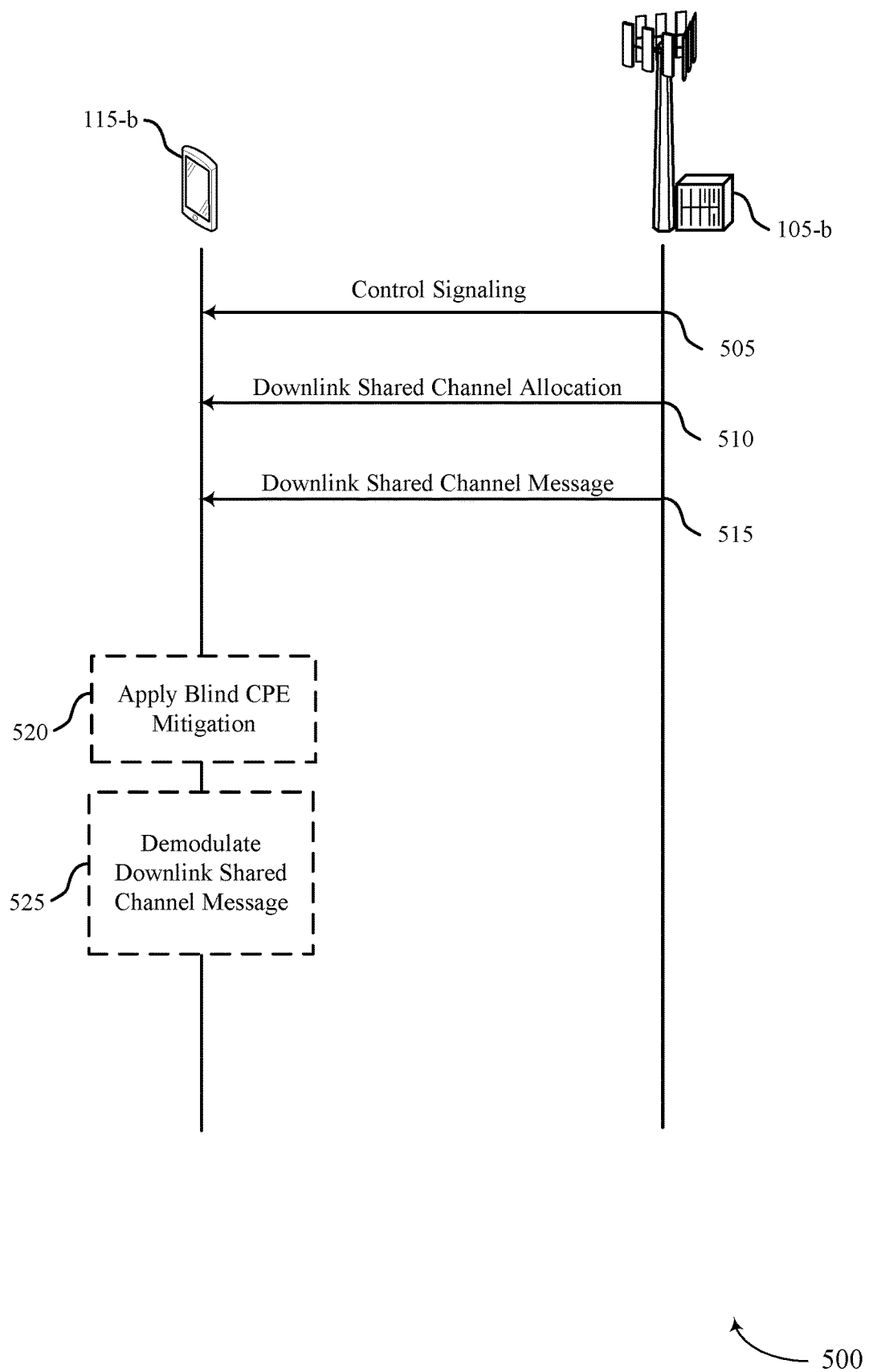
FIG. 5 illustrates an example of a process flow that supports blind CPE and residual CFO mitigation in accordance with aspects of the present disclosure.

FIG. 5 illustrates an example of a process flow 500 that supports blind CPE and residual CFO mitigation in accordance with aspects of the present disclosure. The process flow 500 may include a UE 115-*b*, which may be an example of a UE 115 as described herein. The process flow 500 may include a network device 105-*b*, which may be an example of a base station 105 as described herein. In the following description of the process flow 500, the operations between the network device 105-*b* and the UE 115-*b* may be transmitted in a different order than the example order shown, or the operations performed by the network device 105-*b* and the UE 115-*b* may be performed in different orders or at different times. Some operations may also be omitted from the process flow 500, and other operations may be added to the process flow 500.

At 505, the UE 115-*b* may receive, from the network device 105-*b*, control signaling indicating parameters for a PTRS configuration for a downlink shared channel reception, the parameters indicating to the UE 115-*b* that the PTRS configuration omits a PTRS based on a capability of the UE 115-*b* to apply blind CPE mitigation for downlink shared channel receptions. In some examples, the network device 105-*b* may transmit the control signaling via a RRC message. In some examples, the UE 115-*b* may transmit, to the network device 105-*b*, a control message implicitly indicating the capability of the UE to apply blind CPE mitigation, and in response, the network device 105-*b* may transmit the control signaling at 505. In some examples, the UE 115-*b* may transmit, with the control message, a first indication of one or more PTRS related MCS threshold indices for the downlink shared channel allocation and a second indication of one or more PTRS related bandwidth thresholds for the downlink shared channel allocation.

At 510, the UE 115-*b* may receive, from the network device 105-*b*, control information scheduling a downlink shared channel allocation (without a PTRS based on PTRS configuration provided by 505).

At 515, the UE 115-*b* may receive, from the network device 105-*b*, a downlink shared channel message in the downlink shared channel allocation. The UE 115-*b* may receive the downlink shared channel message in the downlink shared channel allocation in accordance with the parameters. In some examples, receiving the downlink shared channel message conveyed via the downlink shared channel allocation may include applying the blind CPE mitigation at 520 and use the blind CPE mitigation to demodulate the downlink shared channel message at 525. In some examples, applying the blind CPE mitigation may include determining a blind CPE estimation and applying a CPE correction based on the blind CPE estimation.

In some examples, at 510, the UE 115-*b* may receive, from the network device 105-*b*, scheduling information for a set of downlink shared channel allocations associated with a set of component carriers and without a PTRS, where the downlink shared channel allocation is associated with a first component carrier. The UE 115-*b* may receive a set of downlink shared channel messages transmitted simultaneously with the downlink shared channel message via the set of downlink shared channel allocations associated with the set of component carriers based on the determined blind CPE estimation for the downlink shared channel message (on the first component carrier).

In some examples, receiving the downlink shared channel message includes receiving a set of OFDM symbols and the downlink shared channel allocation includes a single demodulation reference signal symbol and a set of OFDM data symbols. In some examples, receiving the downlink shared channel message may include: applying a first CPE mitigation to a first OFDM data symbol of the set of OFDM data symbols, where the first OFDM data symbol may be a nearest OFDM data symbol to the single demodulation reference signal; and demodulating the first OFDM data symbol of the set of OFDM data symbols based at least in part on the first CPE mitigation. In some examples, receiving the downlink shared channel message may further include: applying a second CPE mitigation to a second OFDM data symbol of the set of OFDM data symbols based at least in part on a CPE estimation of the first OFDM data symbol, the second OFDM data symbol adjacent in time to the first OFDM data symbol; and demodulating the second OFDM data symbol of the set of OFDM data symbols based on the second CPE mitigation. In some examples, UE 115-*b* may receive the set of OFDM symbols in the downlink shared channel allocation with an unknown residual CFO having a significantly high value for the applicable numerology such that it may introduce a performance degradation for a wide range of SNR and MCS scenarios if not mitigated.

Figure 6:
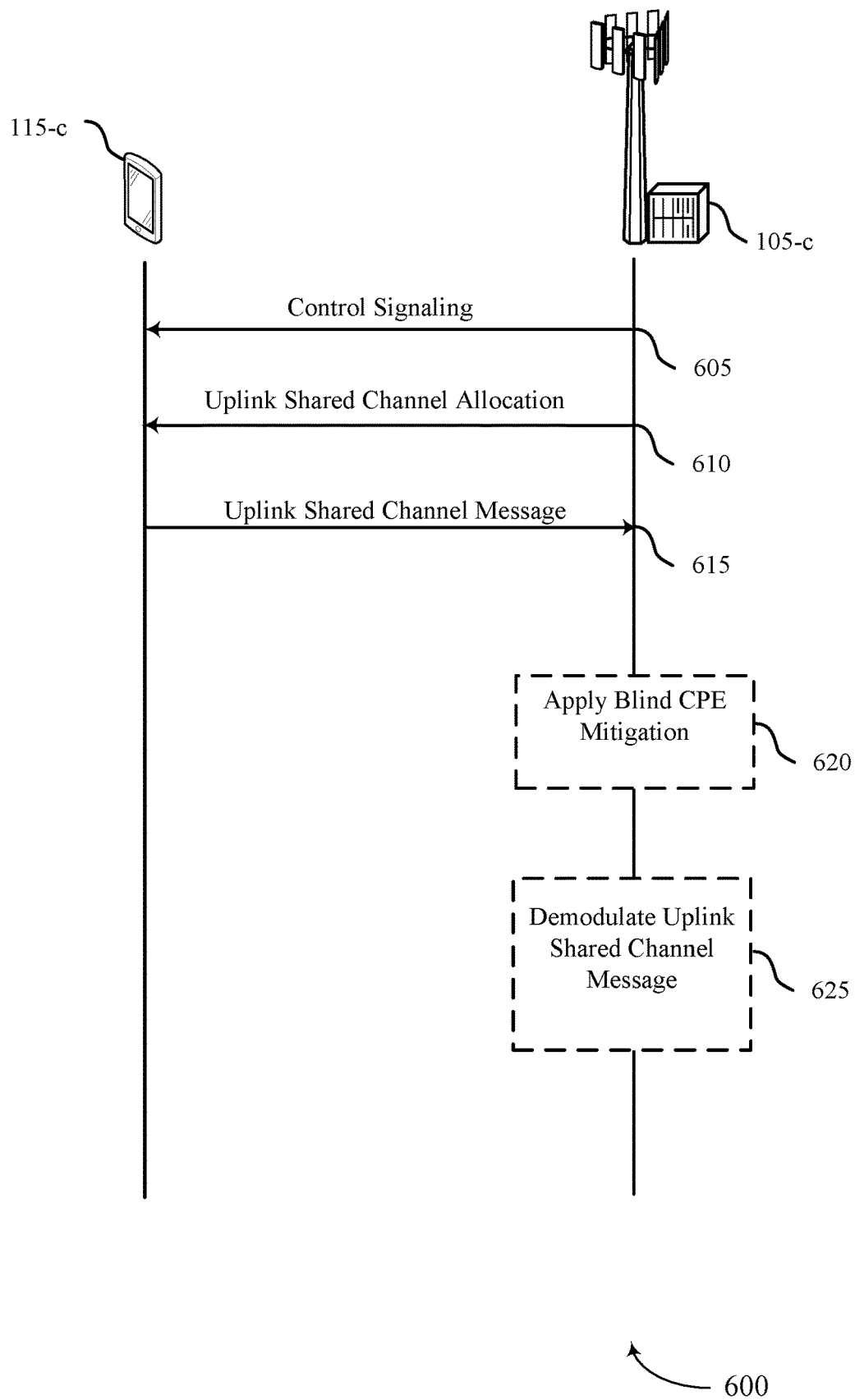
FIG. 6 illustrates an example of a process flow that supports blind CPE and residual CFO mitigation in accordance with aspects of the present disclosure.

FIG. 6 illustrates an example of a process flow 600 that supports blind CPE and residual CFO mitigation in accordance with aspects of the present disclosure. The process flow 600 may include a UE 115-*c*, which may be an example of a UE 115 as described herein. The process flow 600 may include a network device 105-*c*, which may be an example of a network device 105-*a* or a network device 105-*b* as described herein. In the following description of the process flow 600, the operations between the network device 105-*c* and the UE 115-*c* may be transmitted in a different order than the example order shown, or the operations performed by the network device 105-*c* and the UE 115-*c* may be performed in different orders or at different times. Some operations may also be omitted from the process flow 600, and other operations may be added to the process flow 600.

At 605, the UE 115-*c* may receive, from the network device 105-*c*, control signaling indicating to omit transmission of a PTRS in the uplink shared channel allocation.

At 610, the UE 115-*c* may receive, from the network device 105-*c*, control information scheduling an uplink shared channel allocation for transmitting an uplink shared channel message.

At 615, the network device 105-*c* may receive, from the UE 115-*c*, the uplink shared channel message in the uplink shared channel allocation in accordance with a PTRS configuration that omits a PTRS based at least in part on a capability of the network device to apply blind CPE mitigation for uplink shared channel receptions.

In some examples, receiving the uplink shared channel message conveyed via the uplink shared channel allocation may include applying the blind CPE mitigation at 620 and using the blind CPE mitigation to demodulate the uplink shared channel message at 625. In some examples, applying the blind CPE mitigation may include determining a blind CPE estimation and applying a CPE correction based on the blind CPE estimation.

In some examples, at 610, the UE 115-c may receive, from the network device 105-c, scheduling information for a set of uplink shared channel allocations associated with a set of component carriers and without a PTRS transmission (based on PTRS configuration provided by 605), where the uplink shared channel allocation is associated with a first component carrier. The network device 105-c may receive a set of uplink shared channel messages transmitted simultaneously with the uplink shared channel message via the set of uplink shared channel allocations associated with the set of component carriers based on the determined blind CPE estimation for the uplink shared channel message (on the first uplink component carrier).

In some examples, receiving the uplink shared channel message includes receiving a set of OFDM symbols and the uplink shared channel allocation includes a single DMRS symbol and a set of OFDM data symbols. In some examples, receiving the uplink shared channel message may include: applying a first CPE mitigation to a first OFDM data symbol of the set of OFDM data symbols, where the first OFDM data symbol may be a nearest OFDM data symbol to the single demodulation reference signal; and demodulating the first OFDM data symbol of the set of OFDM data symbols based at least in part on the first CPE mitigation. In some examples, receiving the uplink shared channel message may further include: applying a second CPE mitigation to a second OFDM data symbol of the set of OFDM data symbols based at least in part on a CPE estimation of the first OFDM data symbol, the second OFDM data symbol adjacent in time to the first OFDM data symbol; and demodulating the second OFDM data symbol of the set of OFDM data symbols based on the second CPE mitigation. In some examples, network device 105-c may receive the set of OFDM symbols in the uplink shared channel allocation with an unknown residual CFO having a significantly high value for the applicable numerology such that it may introduce a performance degradation for a wide range of SNR and MCS scenarios if not mitigated.

Figure 7:
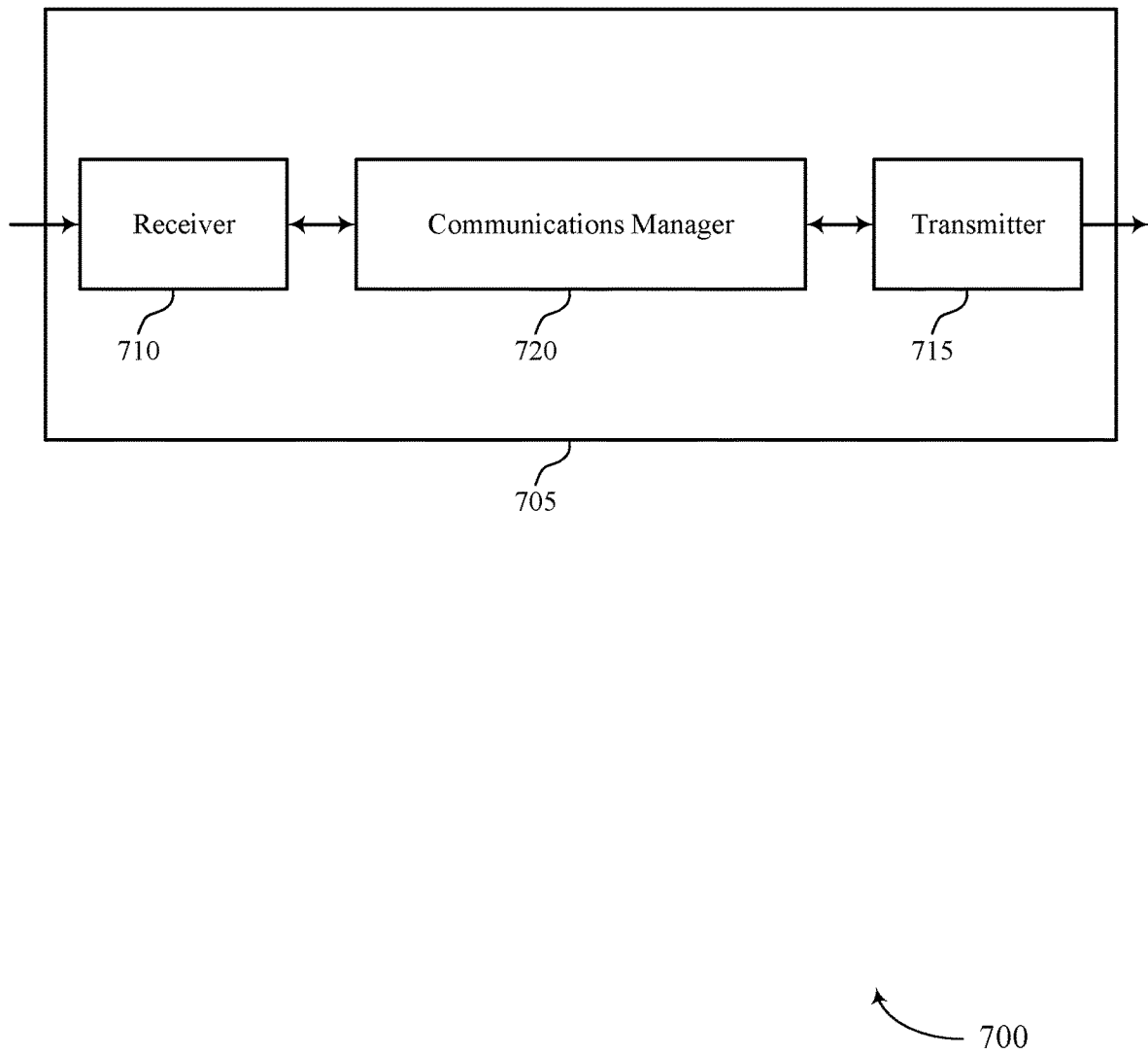
FIGS. 7 and 8 show block diagrams of devices that support blind CPE and residual CFO mitigation in accordance with aspects of the present disclosure.

FIG. 7 shows a block diagram 700 of a device 705 that supports blind CPE and residual CFO mitigation in accordance with aspects of the present disclosure. The device 705 may be an example of aspects of a UE 115 as described herein. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to blind CPE and residual CFO mitigation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to blind CPE and residual CFO mitigation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of blind CPE and residual CFO mitigation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a network device, control signaling indicating parameters for a PTRS configuration for a downlink shared channel reception, the parameters indicating to the UE that the PTRS configuration omits a PTRS based on a capability of the UE to apply blind CPE mitigation for downlink shared channel receptions. The communications manager 720 may be configured as or otherwise support a means for receiving, from the network device, control information scheduling a downlink shared channel allocation without a PTRS.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources by enabling CPE and CFO mitigation without a PTRS.

Figure 8:
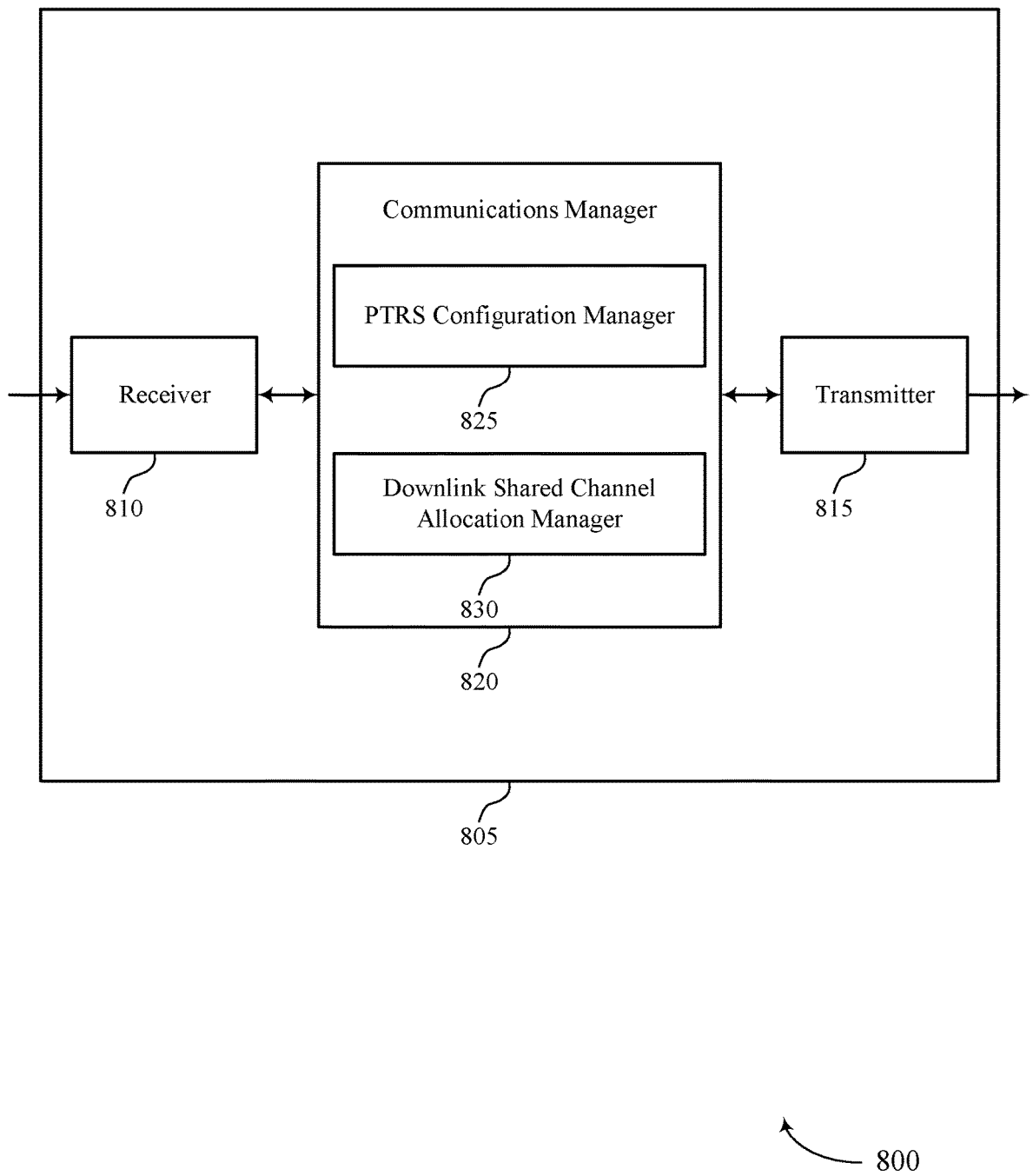

FIG. 8 shows a block diagram 800 of a device 805 that supports blind CPE and residual CFO mitigation in accordance with aspects of the present disclosure. The device 805 may be an example of aspects of a device 805 or a UE 115 as described herein. The device 805 may be an example of aspects of a device 605 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to blind CPE and residual CFO mitigation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to blind CPE and residual CFO mitigation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of blind CPE and residual CFO mitigation as described herein. For example, the communications manager 820 may include an PTRS Configuration Manager 825 a Downlink Shared Channel Allocation Manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The PTRS Configuration Manager 825 may be configured as or otherwise support a means for receiving, from a network device, control signaling indicating parameters for a PTRS configuration for a downlink shared channel reception, the parameters indicating to the UE that the PTRS configuration omits a PTRS based on a capability of the UE to apply blind CPE mitigation for downlink shared channel receptions. The Downlink Shared Channel Allocation Manager 830 may be configured as or otherwise support a means for receiving, from the network device, control information scheduling a downlink shared channel allocation without a PTRS.

Figure 9:
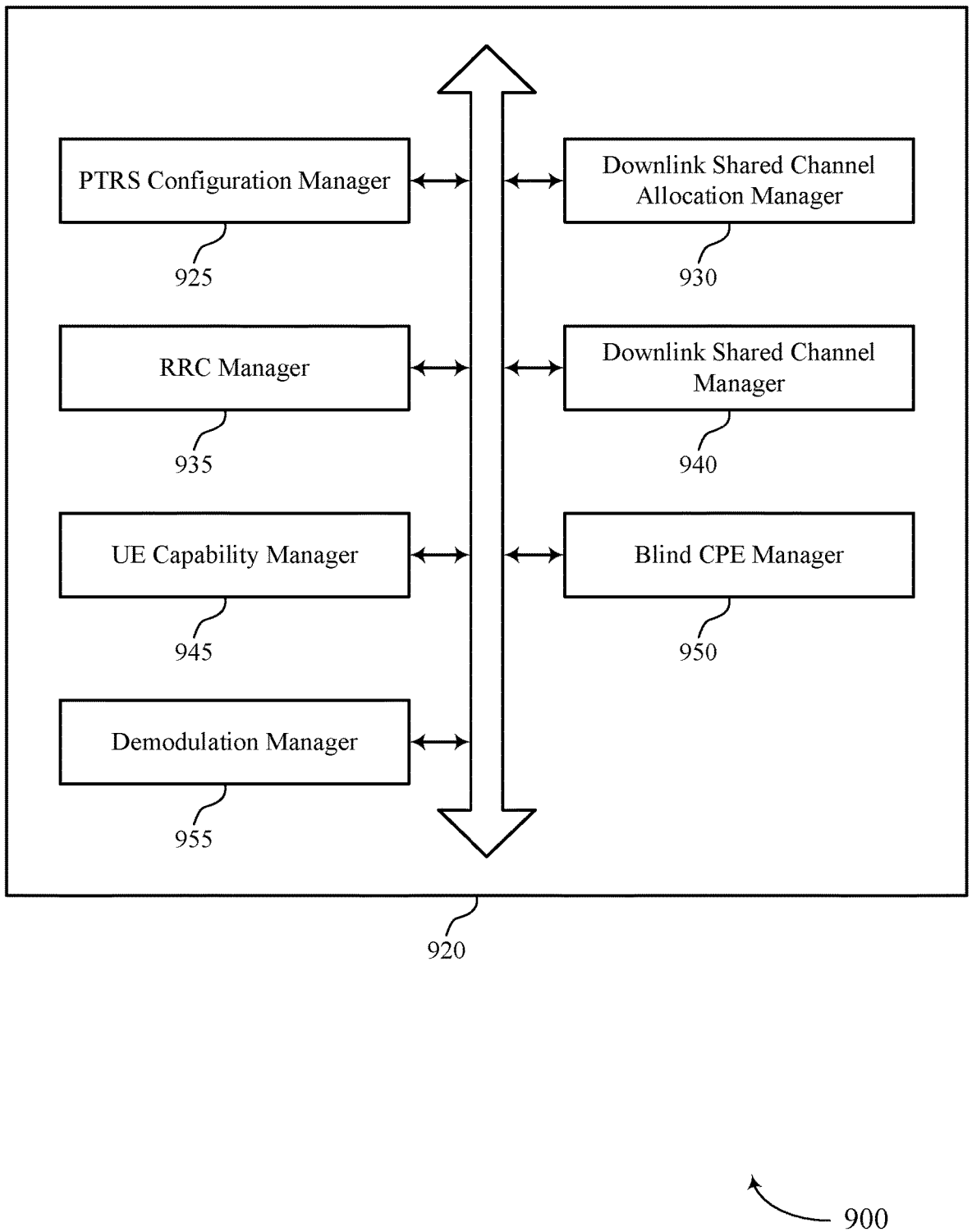
FIG. 9 shows a block diagram of a communications manager that supports blind CPE and residual CFO mitigation in accordance with aspects of the present disclosure.

FIG. 9 shows a block diagram 900 of a communications manager 920 that supports blind CPE and residual CFO mitigation in accordance with aspects of the present disclosure. The communications manager 820 may be an example of aspects of a communications manager 720, a communications manager 820, or both, as described herein. The communications manager 920, or various components thereof, may be an example of means for performing various aspects of blind CPE and residual CFO mitigation as described herein. For example, the communications manager 920 may include an PTRS Configuration Manager 925, a Downlink Shared Channel Allocation Manager 930, an RRC Manager 935, a Downlink Shared Channel Manager 940, a UE Capability Manager 945, a Blind CPE Manager 950, a Demodulation Manager 955, or any combination thereof. Each of these components may communicate, directly or indirectly, with one another (e.g., via one or more buses).

The communications manager 920 may support wireless communications at a UE in accordance with examples as disclosed herein. The PTRS Configuration Manager 925 may be configured as or otherwise support a means for receiving, from a network device, control signaling indicating parameters for a PTRS configuration for a downlink shared channel reception, the parameters indicating to the UE that the PTRS configuration omits a PTRS based on a capability of the UE to apply blind CPE mitigation for downlink shared channel receptions. The Downlink Shared Channel Allocation Manager 930 may be configured as or otherwise support a means for receiving, from the network device, control information scheduling a downlink shared channel allocation without a PTRS.

In some examples, to support receiving the control signaling, the RRC Manager 935 may be configured as or otherwise support a means for receiving the control signaling via a radio resource control message.

In some examples, the Downlink Shared Channel Manager 940 may be configured as or otherwise support a means for receiving a downlink shared channel message in the downlink shared channel allocation in accordance with the parameters.

In some examples, to support receiving the downlink shared channel message, the Blind CPE Manager 950 may be configured as or otherwise support a means for receiving the downlink shared channel message conveyed by the downlink shared channel allocation based on applying the blind CPE mitigation as a part of a downlink shared channel allocation demodulation process.

In some examples, to support applying the blind CPE mitigation, the Blind CPE Manager 950 may be configured as or otherwise support a means for determining a blind CPE estimation. In some examples, to support applying the blind CPE mitigation, the Blind CPE Manager 950 may be configured as or otherwise support a means for applying a blind CPE correction based on the blind CPE estimation.

In some examples, the Downlink Shared Channel Allocation Manager 930 may be configured as or otherwise support a means for receiving, with the control information, scheduling information for a set of downlink shared channel allocations associated with a set of component carriers and without a PTRS, where the downlink shared channel allocation is associated with a first component carrier. In some examples, the Blind CPE Manager 950 may be configured as or otherwise support a means for receiving a set of downlink shared channel messages transmitted simultaneously with the downlink shared channel message via the set of downlink shared channel allocations associated with the set of component carriers based on the determined blind CPE estimation for the downlink shared channel message.

In some examples, to support receiving the downlink shared channel message, the Downlink Shared Channel Manager 940 may be configured as or otherwise support a means for receiving a set of multiple OFDM symbols in the downlink shared channel allocation including a single demodulation reference signal and a set of OFDM data symbols.

In some examples, to support receiving the downlink shared channel message, the Blind CPE Manager 950 may be configured as or otherwise support a means for applying a first CPE mitigation to a first OFDM data symbol of the set of OFDM data symbols, where the first OFDM data symbol includes a nearest OFDM data symbol to the single demodulation reference signal. In some examples, to support receiving the downlink shared channel message, the Demodulation Manager 955 may be configured as or otherwise support a means for demodulating the first OFDM data symbol of the set of OFDM data symbols based on the first CPE mitigation.

In some examples, to support monitoring, the Blind CPE Manager 950 may be configured as or otherwise support a means for applying a second CPE mitigation to a second OFDM data symbol of the set of OFDM data symbols based on a CPE estimation of the first OFDM data symbol, the second OFDM data symbol adjacent in time to the first OFDM data symbol. In some examples, to support monitoring, the Demodulation Manager 955 may be configured as or otherwise support a means for demodulating the second OFDM data symbol of the set of OFDM data symbols based on the second CPE mitigation.

In some examples, to support receiving the downlink shared channel message, the Downlink Shared Channel Allocation Manager 930 may be configured as or otherwise support a means for receiving the set of multiple OFDM symbols in the downlink shared channel allocation with an unknown residual CFO.

In some examples, the downlink shared channel message includes one of a frequency range one cellular cell message or a frequency range two or above cellular cell message.

In some examples, the downlink shared channel message includes a frequency range two or above cellular message.

In some examples, the UE Capability Manager 945 may be configured as or otherwise support a means for transmitting, to the network device, a control message indicating the capability of the UE to apply blind CPE estimation.

In some examples, to support transmitting the control message, the UE Capability Manager 945 may be configured as or otherwise support a means for transmitting, with the control message, a first indication of one or more PTRS related MCS threshold indices for the downlink shared channel allocation and a second indication of one or more PTRS related bandwidth thresholds for the downlink shared channel allocation.

Figure 10:
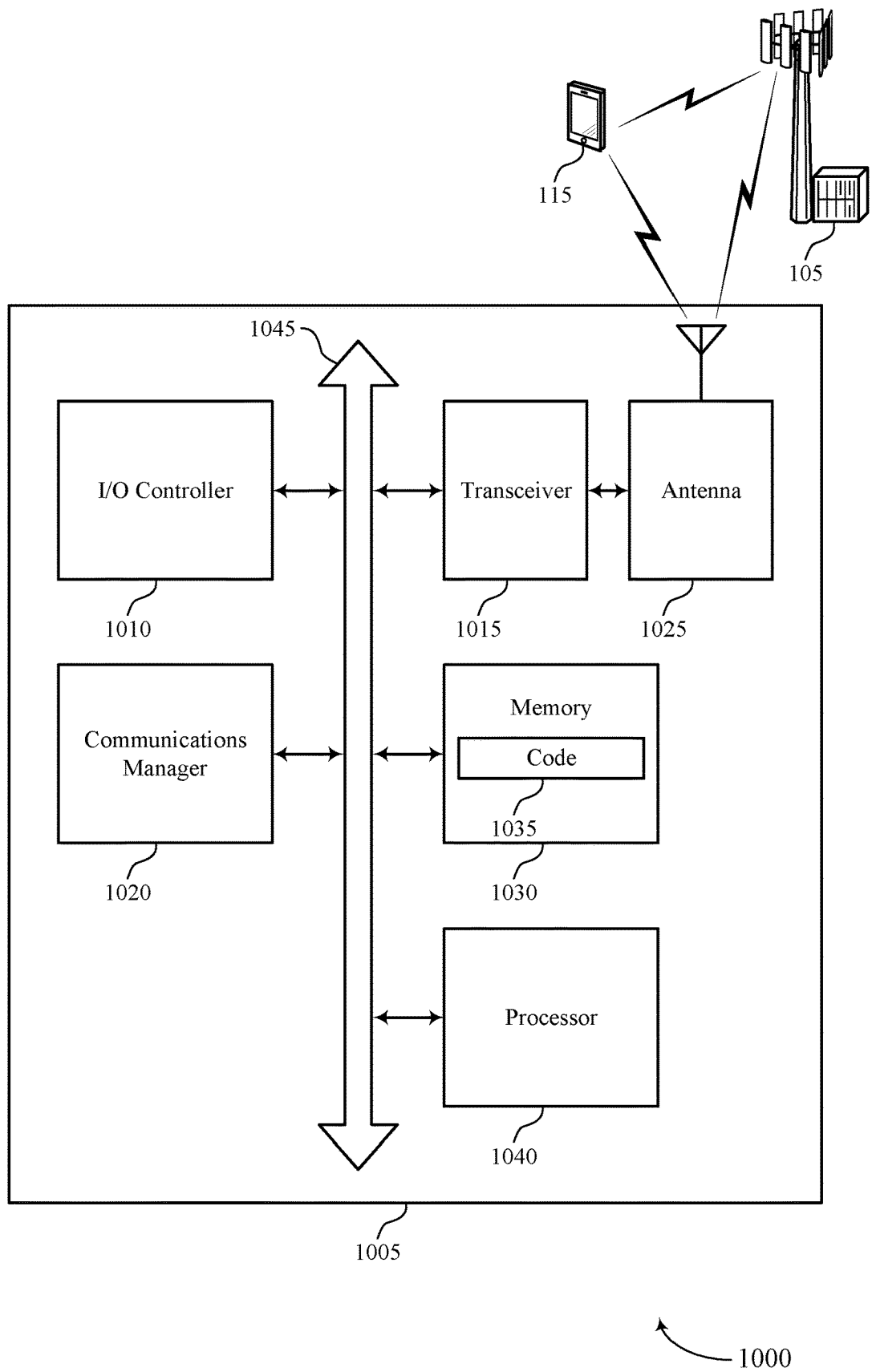
FIG. 10 shows a diagram of a system including a device that supports blind CPE and residual CFO mitigation in accordance with aspects of the present disclosure.

FIG. 10 shows a diagram of a system 1000 including a device 1005 that supports blind CPE and residual CFO mitigation in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting blind CPE and residual CFO mitigation). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a network device, control signaling indicating parameters for a PTRS configuration for a downlink shared channel reception, the parameters indicating to the UE that the PTRS configuration omits a PTRS based on a capability of the UE to apply blind CPE mitigation for downlink shared channel receptions. The communications manager 1020 may be configured as or otherwise support a means for receiving, from the network device, control information scheduling a downlink shared channel allocation without a PTRS.

By including or configuring the communications manager 1020 in accordance with examples as described herein, the device 1005 may support techniques for improved communication reliability and more efficient utilization of communication resources by enabling CPE and CFO mitigation without a PTRS.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of blind CPE and residual CFO mitigation as described herein, or the processor 1040 and the memory 1030 may be otherwise configured to perform or support such operations.

Figure 11:
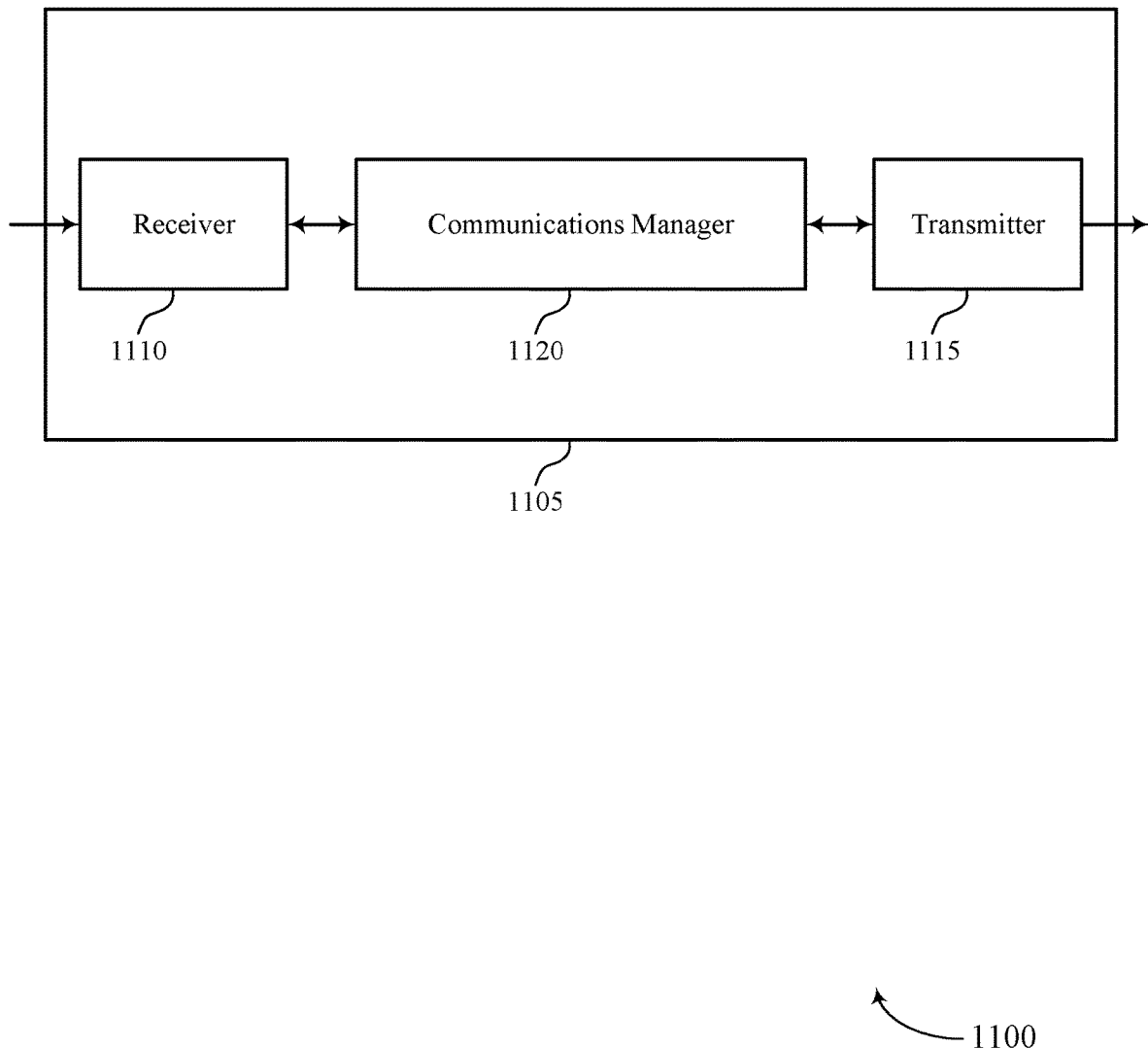
FIGS. 11 and 12 show block diagrams of devices that support blind CPE and residual CFO mitigation in accordance with aspects of the present disclosure.

FIG. 11 shows a block diagram 1100 of a device 1105 that supports blind CPE and residual CFO mitigation in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to blind CPE and residual CFO mitigation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to blind CPE and residual CFO mitigation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of blind CPE and residual CFO mitigation as described herein. For example, the communications manager 1120, the receiver 1010, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a network device in accordance with examples as disclosed herein. For example, the communications manager 1120 may be configured as or otherwise support a means for transmitting, to a UE, control information scheduling an uplink shared channel allocation for transmitting an uplink shared channel message. The communications manager 1120 may be configured as or otherwise support a means for transmitting, to the UE, control signaling indicating to omit transmission of a PTRS in the uplink shared channel allocation. The communications manager 1120 may be configured as or otherwise support a means for receiving the uplink shared channel message in the uplink shared channel allocation in accordance with a PTRS configuration that omits a PTRS based on a capability of the network device to apply blind CPE mitigation for uplink shared channel receptions.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources by enabling CPE and CFO mitigation without a PTRS.

Figure 12:
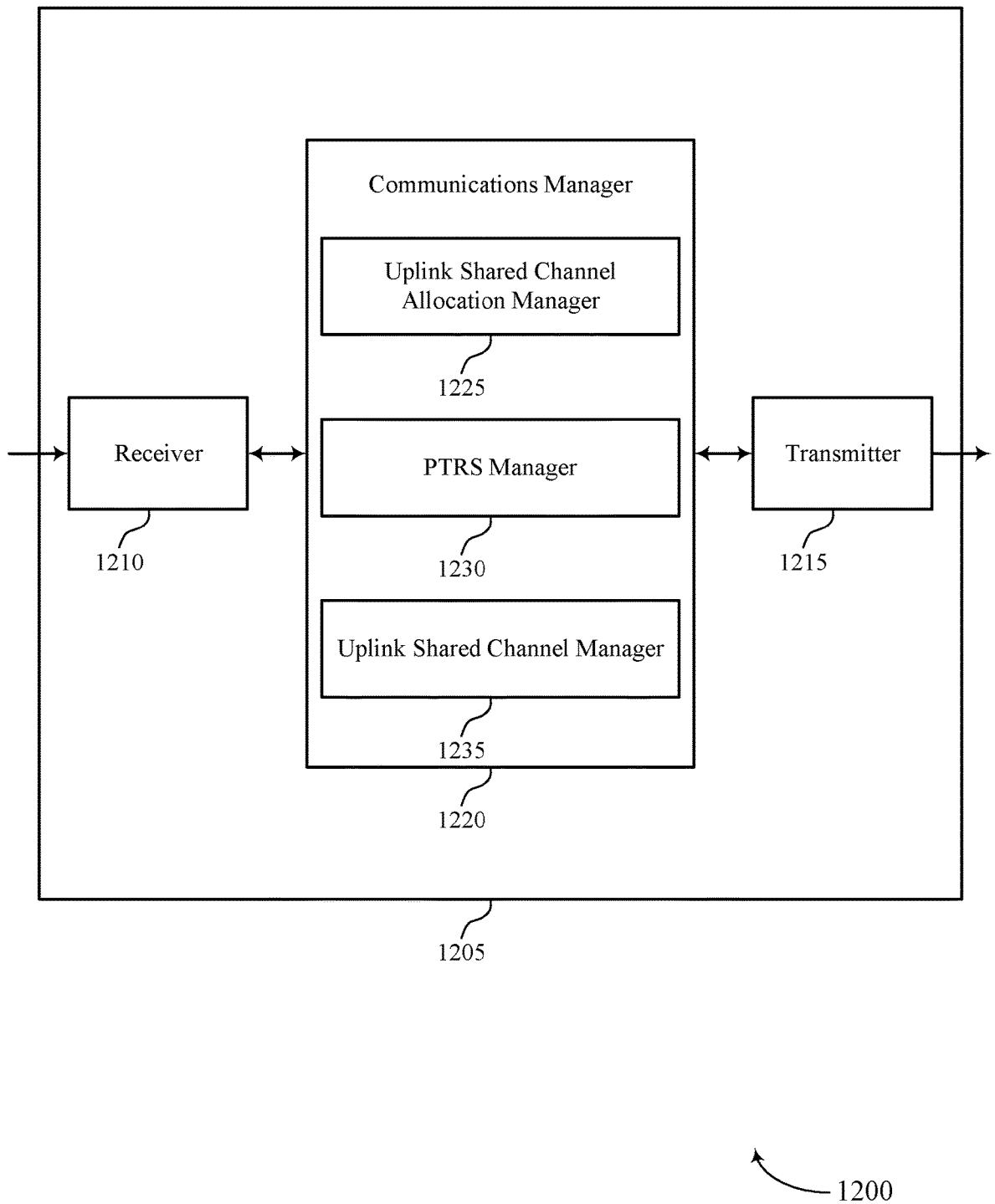

FIG. 12 shows a block diagram 1200 of a device 1205 that supports blind CPE and residual CFO mitigation in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to blind CPE and residual CFO mitigation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to blind CPE and residual CFO mitigation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of blind CPE and residual CFO mitigation as described herein. For example, the communications manager 1220 may include an Uplink Shared Channel Allocation Manager 1225, an PTRS Manager 1230, an Uplink Shared Channel Manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a network device in accordance with examples as disclosed herein. The Uplink Shared Channel Allocation Manager 1225 may be configured as or otherwise support a means for transmitting, to a UE, control information scheduling an uplink shared channel allocation for transmitting an uplink shared channel message. The PTRS Manager 1230 may be configured as or otherwise support a means for transmitting, to the UE, control signaling indicating to omit transmission of a PTRS in the uplink shared channel allocation. The Uplink Shared Channel Manager 1235 may be configured as or otherwise support a means for receiving the uplink shared channel message in the uplink shared channel allocation in accordance with a PTRS configuration that omits a PTRS based on a capability of the network device to apply blind CPE mitigation for uplink shared channel receptions.

Figure 13:
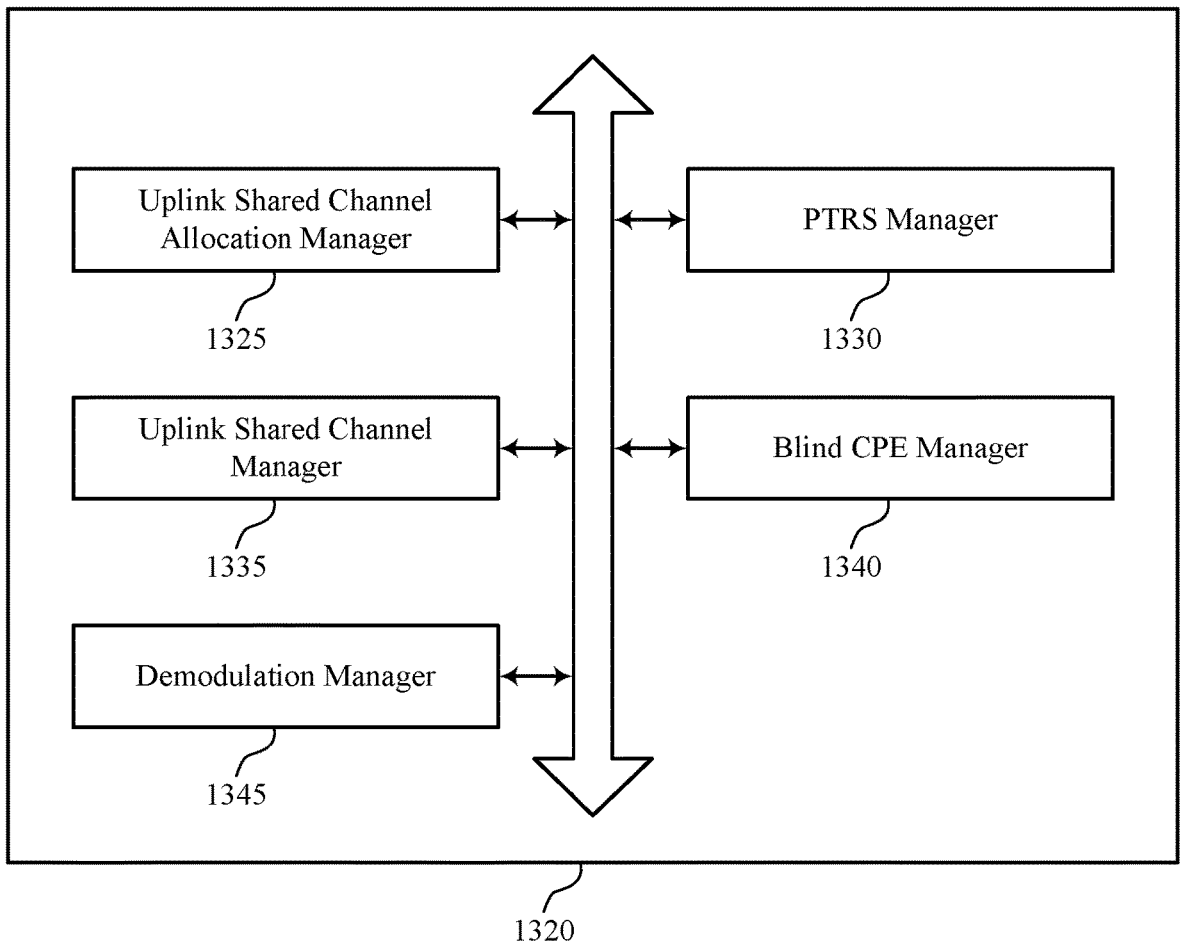
FIG. 13 shows a block diagram of a communications manager that supports blind CPE and residual CFO mitigation in accordance with aspects of the present disclosure.

FIG. 13 shows a block diagram 1300 of a communications manager 1320 that supports blind CPE and residual CFO mitigation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of blind CPE and residual CFO mitigation as described herein. For example, the communications manager 1320 may include an Uplink Shared Channel Allocation Manager 1325, an PTRS Manager 1330, an Uplink Shared Channel Manager 1335, a Blind CPE Manager 1340, a Demodulation Manager 1345, or any combination thereof. Each of these components may communicate, directly or indirectly, with one another (e.g., via one or more buses).

The communications manager 1320 may support wireless communications at a network device in accordance with examples as disclosed herein. The Uplink Shared Channel Allocation Manager 1325 may be configured as or otherwise support a means for transmitting, to a UE, control information scheduling an uplink shared channel allocation for transmitting an uplink shared channel message. The PTRS Manager 1330 may be configured as or otherwise support a means for transmitting, to the UE, control signaling indicating to omit transmission of a PTRS in the uplink shared channel allocation. The Uplink Shared Channel Manager 1335 may be configured as or otherwise support a means for receiving the uplink shared channel message in the uplink shared channel allocation in accordance with a PTRS configuration that omits a PTRS based on a capability of the network device to apply blind CPE mitigation for uplink shared channel receptions.

In some examples, to support receiving the uplink shared channel message, the Blind CPE Manager 1340 may be configured as or otherwise support a means for receiving the uplink shared channel message conveyed by the uplink shared channel allocation based on applying the blind CPE mitigation as a part of an uplink shared channel allocation demodulation process.

In some examples, to support applying the blind CPE mitigation, the Blind CPE Manager 1340 may be configured as or otherwise support a means for determining a blind CPE estimation. In some examples, to support applying the blind CPE mitigation, the Blind CPE Manager 1240 may be configured as or otherwise support a means for applying a blind CPE correction based on the blind CPE estimation.

In some examples, the PTRS Manager 1330 may be configured as or otherwise support a means for transmitting, with the control information, scheduling information for a set of uplink shared channel allocations associated with a set of component carriers and without a PTRS, where the uplink shared channel allocation is associated with a first component carrier. In some examples, the Uplink Shared Channel Manager 1335 may be configured as or otherwise support a means for receiving a set of uplink shared channel messages transmitted simultaneously with the uplink shared channel message via the set of uplink shared channel allocations associated with the set of component carriers based on the determined blind CPE estimation for the uplink shared channel message.

In some examples, to support receiving the uplink shared channel message, the Uplink Shared Channel Manager 1335 may be configured as or otherwise support a means for receiving a set of multiple OFDM symbols in the uplink shared channel allocation including a single demodulation reference signal and a set of OFDM data symbols.

In some examples, to support receiving the uplink shared channel message, the Blind CPE Manager 1340 may be configured as or otherwise support a means for applying a first CPE mitigation to a first OFDM data symbol of the set of OFDM symbols, where the first OFDM data symbol includes a nearest OFDM data symbol to the single demodulation reference signal. In some examples, to support receiving the uplink shared channel message, the Demodulation Manager 1345 may be configured as or otherwise support a means for demodulating the first OFDM data symbol of the set of OFDM data symbols based on the first CPE mitigation.

In some examples, to support receiving the uplink shared channel message, the Blind CPE Manager 1340 may be configured as or otherwise support a means for applying a second CPE mitigation to a second OFDM data symbol of the set of OFDM data symbols based on the first CPE mitigation of the first OFDM data symbol, the second OFDM data symbol adjacent in time to the first OFDM data symbol. In some examples, to support receiving the uplink shared channel message, the Demodulation Manager 1345 may be configured as or otherwise support a means for demodulating the second OFDM data symbol of the set of OFDM data symbols based on the second CPE mitigation.

In some examples, to support receiving the uplink shared channel message, the Uplink Shared Channel Manager 1335 may be configured as or otherwise support a means for receiving the set of multiple OFDM symbols in the uplink shared channel allocation with an unknown residual CFO.

In some examples, the uplink shared channel message includes one of a frequency range one cellular cell message or a frequency range two or above cellular cell message.

In some examples, the uplink shared channel message includes a frequency range two or above cellular message.

Figure 14:
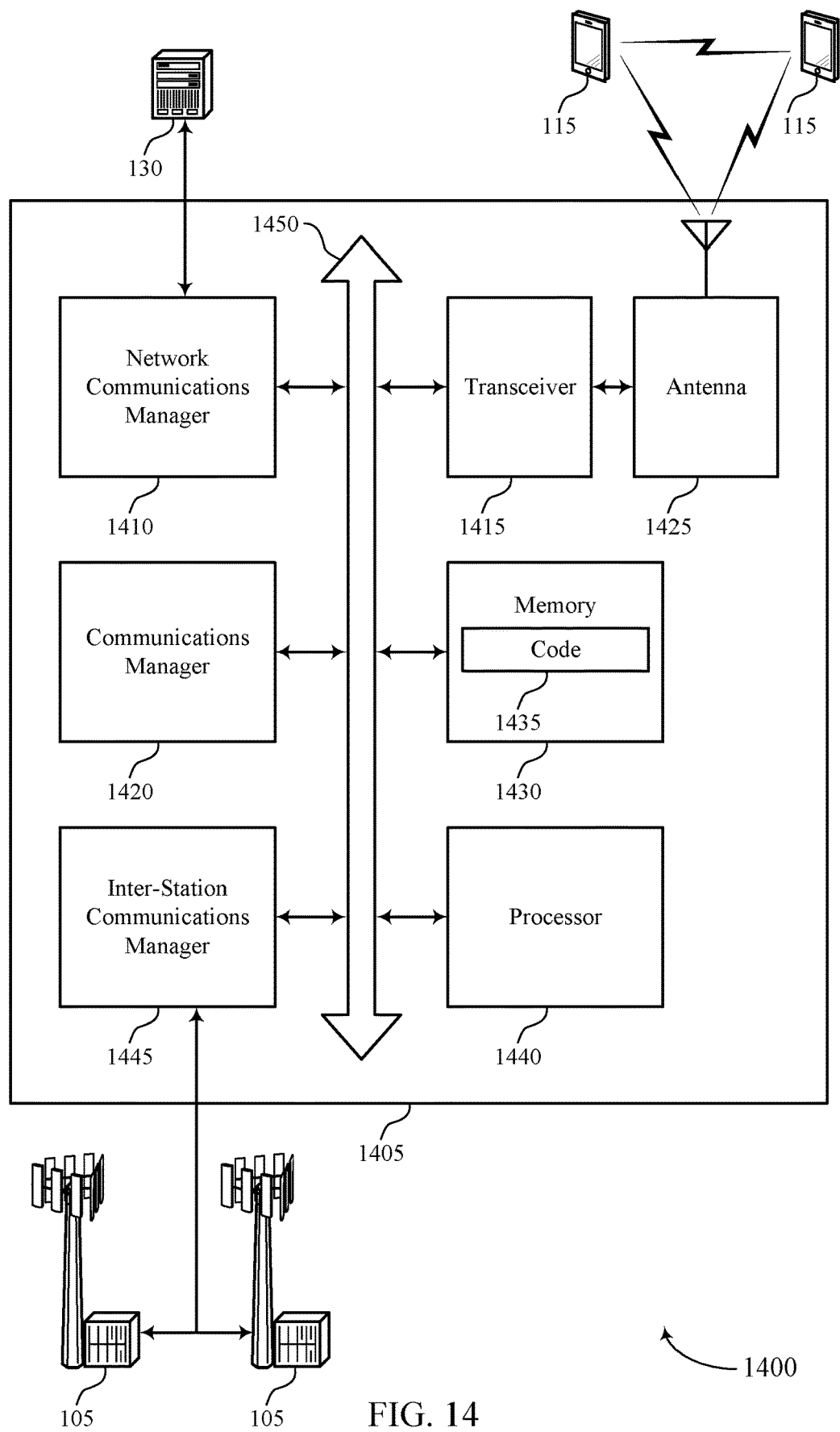
FIG. 14 shows a diagram of a system including a device that supports blind CPE and residual CFO mitigation in accordance with aspects of the present disclosure.

FIG. 14 shows a diagram of a system 1400 including a device 1405 that supports blind CPE and residual CFO mitigation in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1325 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting blind CPE and residual CFO mitigation). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a network device in accordance with examples as disclosed herein. For example, the communications manager 1420 may be configured as or otherwise support a means for transmitting, to a UE, control information scheduling an uplink shared channel allocation for transmitting an uplink shared channel message. The communications manager 1420 may be configured as or otherwise support a means for transmitting, to the UE, control signaling indicating to omit transmission of a PTRS in the uplink shared channel allocation. The communications manager 1420 may be configured as or otherwise support a means for receiving the uplink shared channel message in the uplink shared channel allocation in accordance with a PTRS configuration that omits a PTRS based on a capability of the network device to apply blind CPE mitigation for uplink shared channel receptions.

By including or configuring the communications manager 1420 in accordance with examples as described herein, the device 1405 may support techniques for improved communication reliability, reduced latency, and more efficient utilization of communication resources by enabling CPE and CFO mitigation without a PTRS.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of blind CPE and residual CFO mitigation as described herein, or the processor 1440 and the memory 1430 may be otherwise configured to perform or support such operations.

Figure 15:
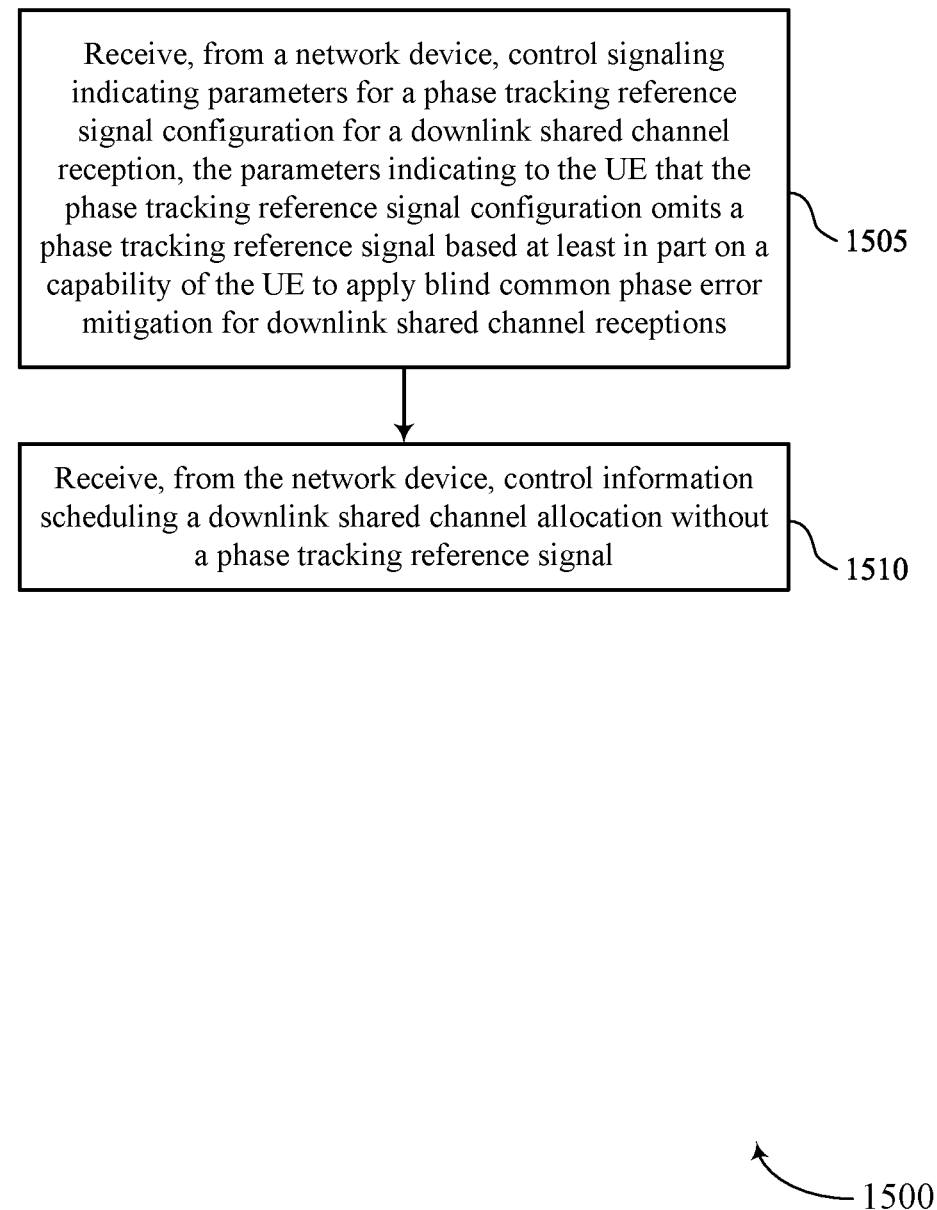
FIGS. 15 through 18 show flowcharts illustrating methods that support blind CPE and residual CFO mitigation in accordance with aspects of the present disclosure.

FIG. 15 shows a flowchart illustrating a method 1500 that supports blind CPE and residual CFO mitigation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a network device, control signaling indicating parameters for a PTRS configuration for a downlink shared channel reception, the parameters indicating to the UE that the PTRS configuration omits a PTRS based on a capability of the UE to apply blind CPE mitigation for downlink shared channel receptions. The operations of 1505 may be performed in accordance with examples as disclosed herein. In some examples, aspects of the operations of 1505 may be performed by an PTRS Configuration Manager 925 as described with reference to FIG. 9.

At 1510, the method may include receiving, from the base station, control information scheduling a downlink shared channel allocation without a PTRS. The operations of 1510 may be performed in accordance with examples as disclosed herein. In some examples, aspects of the operations of 1510 may be performed by a Downlink Shared Channel Allocation Manager 930 as described with reference to FIG. 9.

Figure 16:
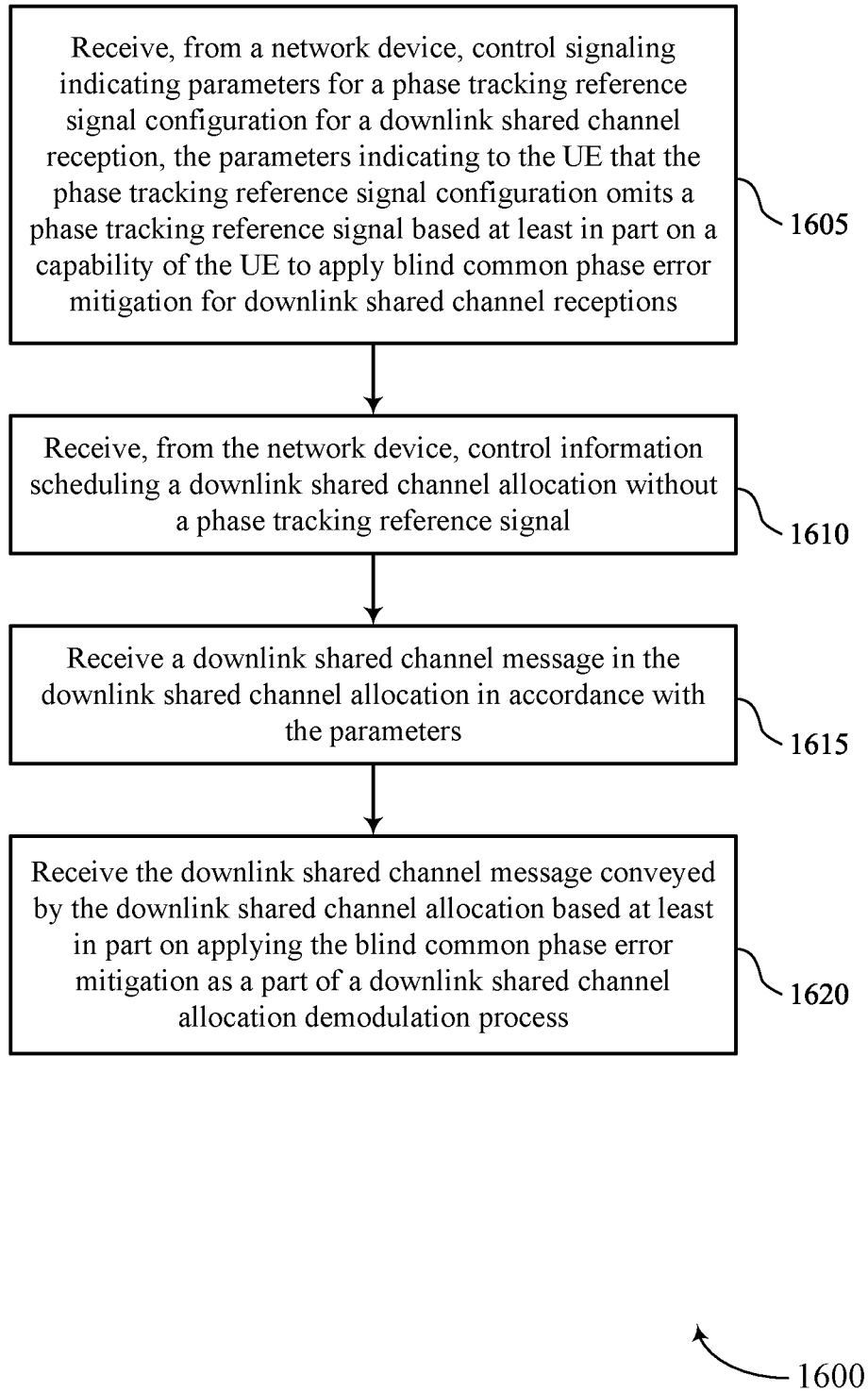

FIG. 16 shows a flowchart illustrating a method 1600 that supports blind CPE and residual CFO mitigation in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a network device, control signaling indicating parameters for a PTRS configuration for a downlink shared channel reception, the parameters indicating to the UE that the PTRS configuration omits a PTRS based on a capability of the UE to apply blind CPE mitigation for downlink shared channel receptions. The operations of 1605 may be performed in accordance with examples as disclosed herein. In some examples, aspects of the operations of 1605 may be performed by an PTRS Configuration Manager 925 as described with reference to FIG. 9.

At 1610, the method may include receiving, from the network device, control information scheduling a downlink shared channel allocation without a PTRS. The operations of 1610 may be performed in accordance with examples as disclosed herein. In some examples, aspects of the operations of 1510 may be performed by a Downlink Shared Channel Allocation Manager 930 as described with reference to FIG. 9.

At 1615, the method may include receiving a downlink shared channel message in the downlink shared channel allocation in accordance with the parameters. The operations of 1615 may be performed in accordance with examples as disclosed herein. In some examples, aspects of the operations of 1615 may be performed by a Downlink Shared Channel Manager 940 as described with reference to FIG. 9.

At 1620, the method may include receiving the downlink shared channel message conveyed by the downlink shared channel allocation based on applying the blind CPE mitigation as a part of a downlink shared channel allocation demodulation process. The operations of 1620 may be performed in accordance with examples as disclosed herein. In some examples, aspects of the operations of 1620 may be performed by a Blind CPE Manager 950 as described with reference to FIG. 9.

Figure 17:
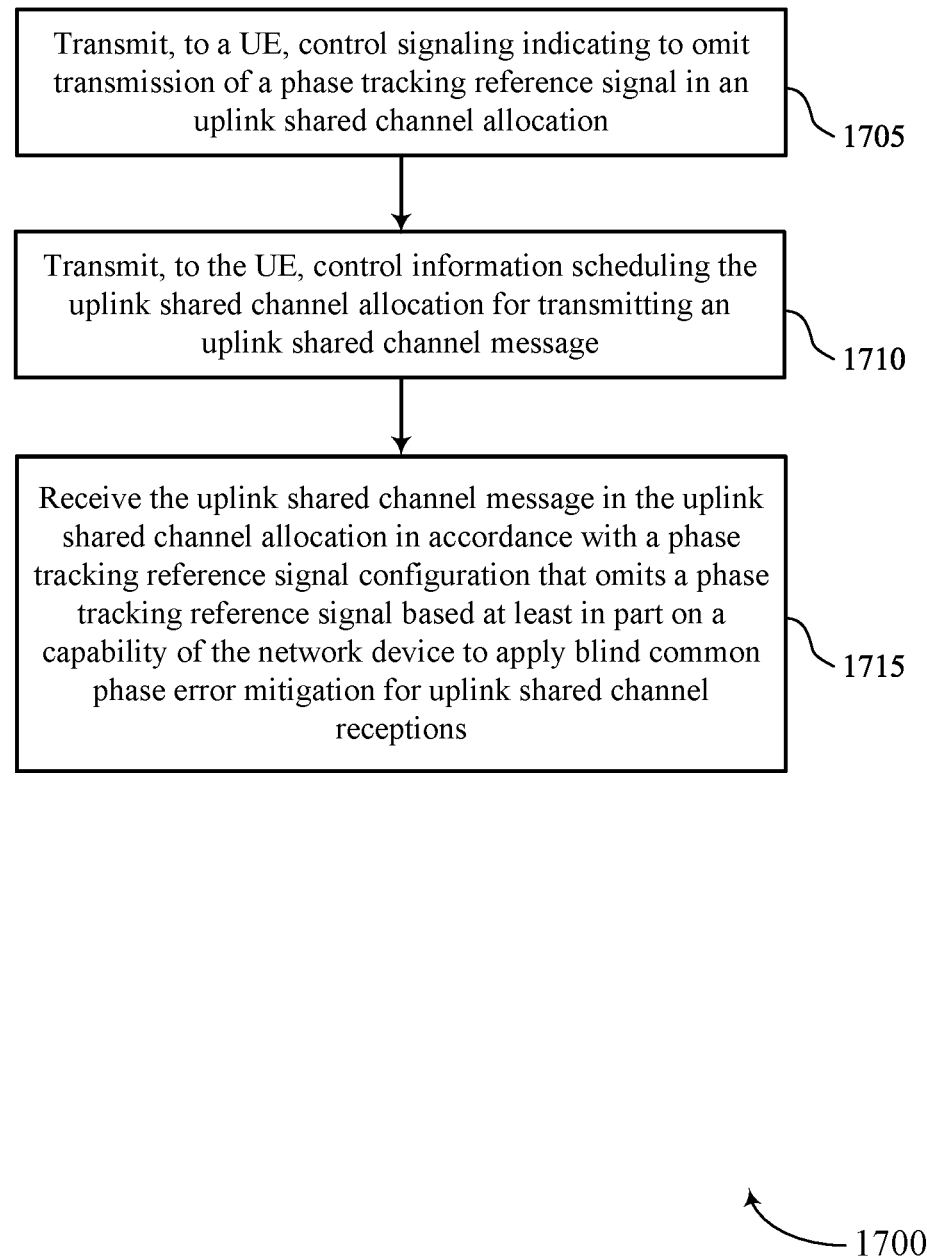

FIG. 17 shows a flowchart illustrating a method 1700 that supports blind CPE and residual CFO mitigation in accordance with aspects of the present disclosure. The operations of the method 1700 may be implemented by a network device or its components as described herein. For example, the operations of the method 1700 may be performed by a base station 105 or a network device as described with reference to FIGS. 1 through 6 and 11 through 14. In some examples, a network device may execute a set of instructions to control the functional elements of the network device to perform the described functions. Additionally, or alternatively, the network device may perform aspects of the described functions using special-purpose hardware.

At 1705, the method may include transmitting, to a UE, control signaling indicating to omit transmission of a PTRS in an uplink shared channel allocation. The operations of 1705 may be performed in accordance with examples as disclosed herein. In some examples, aspects of the operations of 1705 may be performed by an PTRS Manager 1330 as described with reference to FIG. 13.

At 1710, the method may include transmitting, to the UE, control information scheduling the uplink shared channel allocation for transmitting an uplink shared channel message. The operations of 1710 may be performed in accordance with examples as disclosed herein. In some examples, aspects of the operations of 1710 may be performed by an Uplink Shared Channel Allocation Manager 1325 as described with reference to FIG. 13.

At 1715, the method may include receiving the uplink shared channel message in the uplink shared channel allocation in accordance with a PTRS configuration that omits a PTRS based on a capability of the network device to apply blind CPE mitigation for uplink shared channel receptions. The operations of 1715 may be performed in accordance with examples as disclosed herein. In some examples, aspects of the operations of 1715 may be performed by an Uplink Shared Channel Manager 1335 as described with reference to FIG. 13.

Figure 18:
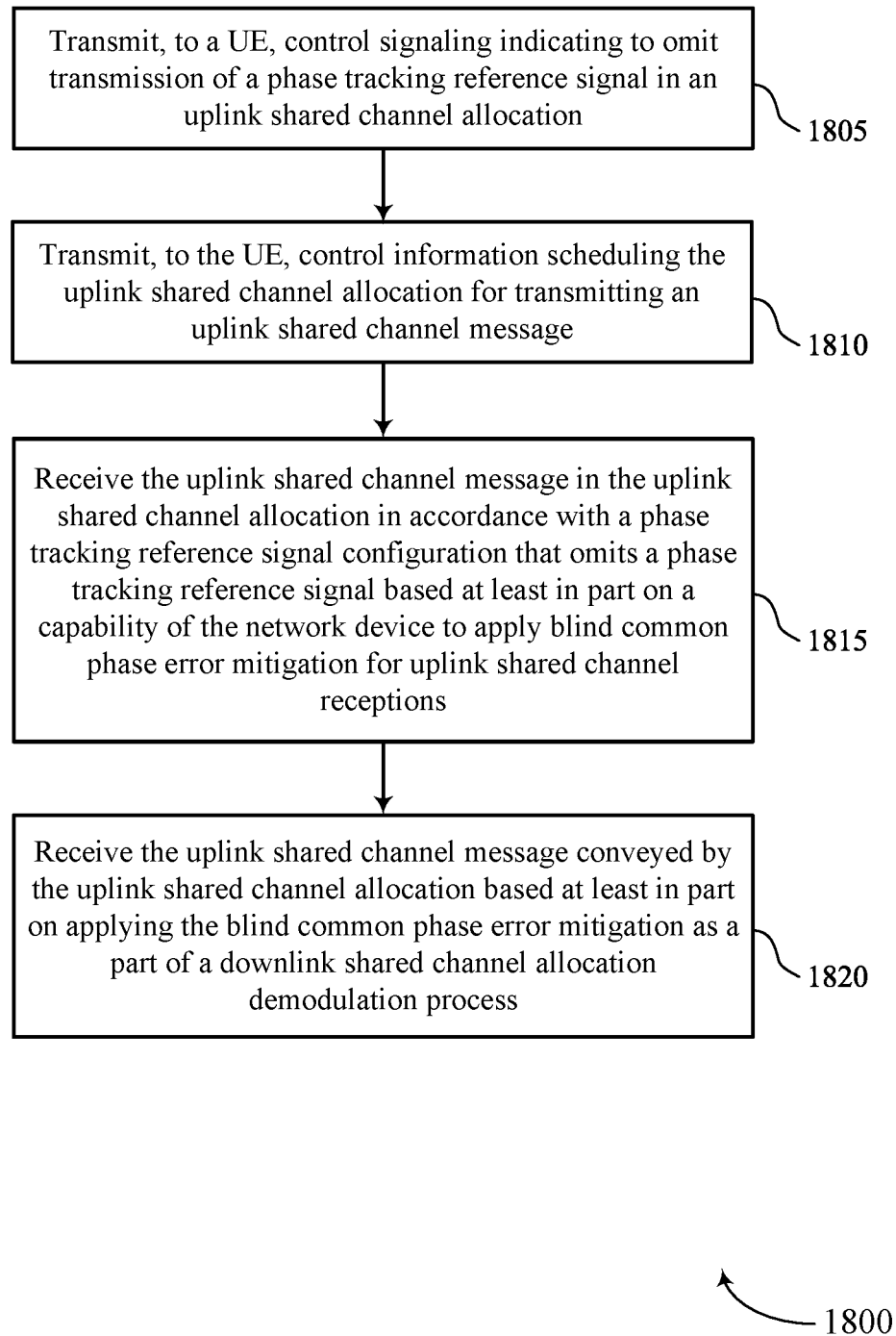

FIG. 18 shows a flowchart illustrating a method 1800 that supports blind CPE and residual CFO mitigation in accordance with aspects of the present disclosure. The operations of the method 1800 may be implemented by a network device or its components as described herein. For example, the operations of the method 1800 may be performed by a base station 105 or a network device as described with reference to FIGS. 1 through 6 and 11 through 14. In some examples, a network device may execute a set of instructions to control the functional elements of the network device to perform the described functions. Additionally, or alternatively, the network device may perform aspects of the described functions using special-purpose hardware.

At 1705, the method may include transmitting, to a UE, control signaling indicating to omit transmission of a PTRS in an uplink shared channel allocation. The operations of 1805 may be performed in accordance with examples as disclosed herein. In some examples, aspects of the operations of 1805 may be performed by an PTRS Manager 1330 as described with reference to FIG. 13.

At 1810, the method may include transmitting, to the UE, control information scheduling an uplink shared channel allocation for transmitting an uplink shared channel message. The operations of 1810 may be performed in accordance with examples as disclosed herein. In some examples, aspects of the operations of 1810 may be performed by an Uplink Shared Channel Allocation Manager 1325 as described with reference to FIG. 13.

At 1815, the method may include receiving the uplink shared channel message in the uplink shared channel allocation in accordance with a PTRS configuration that omits a PTRS based on a capability of the network device to apply blind CPE mitigation for uplink shared channel receptions. The operations of 1815 may be performed in accordance with examples as disclosed herein. In some examples, aspects of the operations of 1815 may be performed by an Uplink Shared Channel Manager 1335 as described with reference to FIG. 13.

At 1820, the method may include receiving the uplink shared channel message conveyed by the uplink shared channel allocation based on applying the blind CPE mitigation as a part of an uplink shared channel allocation demodulation process. The operations of 1820 may be performed in accordance with examples as disclosed herein. In some examples, aspects of the operations of 1820 may be performed by a Blind CPE Manager 1340 as described with reference to FIG. 13.

Figure 19:
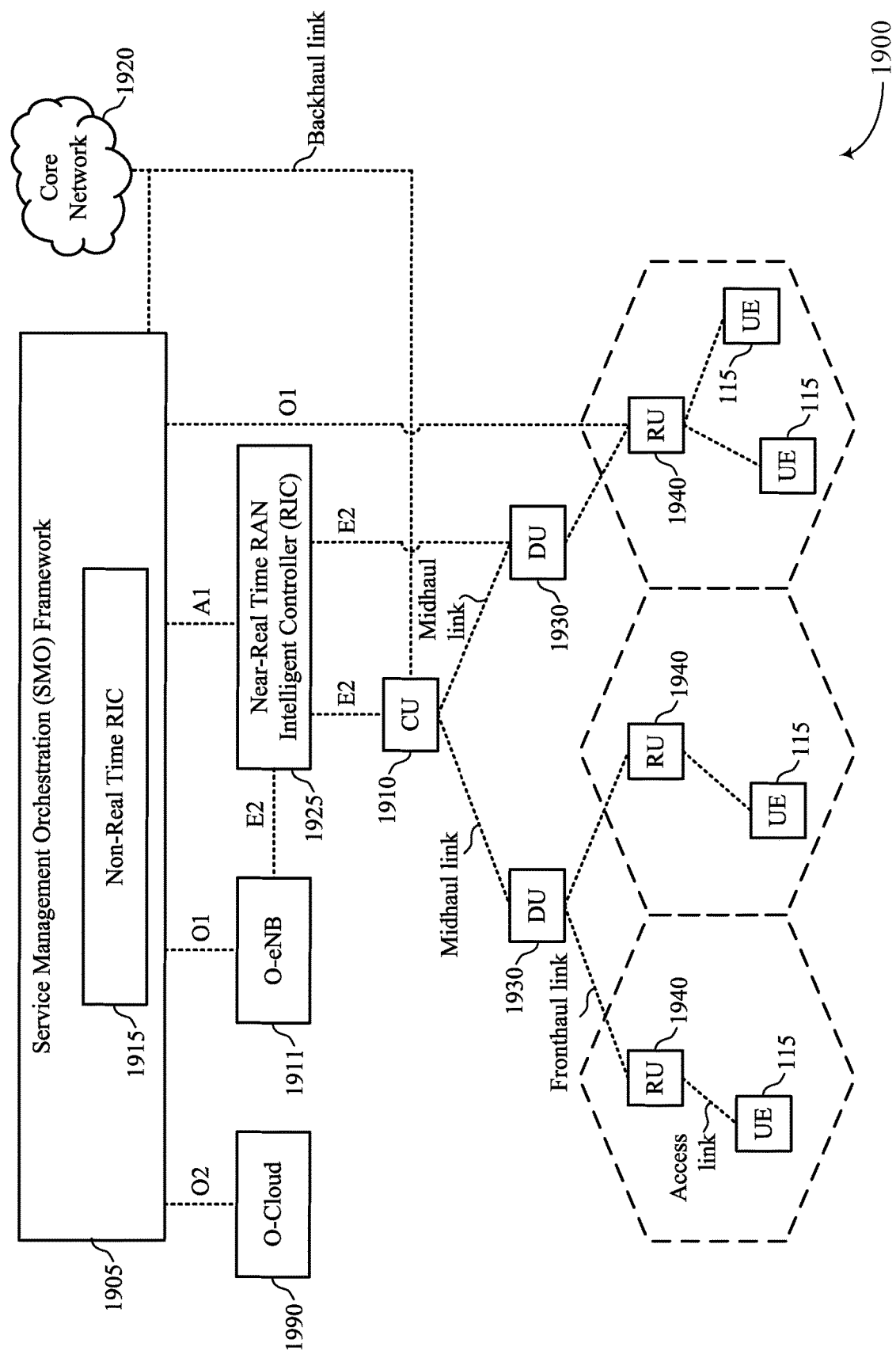
FIG. 19 illustrates an example of a wireless communications system that supports blind CPE and residual CFO mitigation in accordance with aspects of the present disclosure.

FIG. 19 shows a diagram illustrating an example disaggregated base station 1900 architecture. The disaggregated base station 1900 architecture may include one or more CUs 1910 that can communicate directly with a core network 1920 via a backhaul link, or indirectly with the core network 1920 through one or more disaggregated base station units (such as a Near-Real Time (Near-RT) RAN Intelligent Controller (RIC) 1925 via an E2 link, or a Non-Real Time (Non-RT) RIC 1915 associated with a Service Management and Orchestration (SMO) Framework 1905, or both). A CU 1910 may communicate with one or more DUs 1930 via respective midhaul links, such as an F1 interface. The DUs 1930 may communicate with one or more RUs 1940 via respective fronthaul links. The RUs 1940 may communicate with respective UEs 115 via one or more radio frequency (RF) access links. In some implementations, the UE 115 may be simultaneously served by multiple RUs 1940.

Each of the units, i.e., the CUs 1910, the DUs 1930, the RUs 1940, as well as the Near-RT RICs 1925, the Non-RT RICs 1915 and the SMO Framework 1905, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 1910 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1910. The CU 1910 may be configured to handle user plane functionality (i.e., Central Unit-User Plane (CU-UP)), control plane functionality (i.e., Central Unit-Control Plane (CU-CP)), or a combination thereof. In some implementations, the CU 1910 can be logically split into one or more CU-UP units and one or more CU-CP units. The CU-UP unit can communicate bidirectionally with the CU-CP unit via an interface, such as the E1 interface when implemented in an O-RAN configuration. The CU 1910 can be implemented to communicate with the DU 1930, as necessary, for network control and signaling.

The DU 1930 may correspond to a logical unit that includes one or more base station functions to control the operation of one or more RUs 1940. In some aspects, the DU 1930 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1930 may further host one or more low PHY layers. Each layer (or module) can be implemented with an interface configured to communicate signals with other layers (and modules) hosted by the DU 1930, or with the control functions hosted by the CU 1910.

Lower-layer functionality can be implemented by one or more RUs 1940. In some deployments, an RU 1940, controlled by a DU 1930, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1940 can be implemented to handle over the air (OTA) communication with one or more UEs 115. In some implementations, real-time and non-real-time aspects of control and user plane communication with the RU(s) 1940 can be controlled by the corresponding DU 1930. In some scenarios, this configuration can enable the DU(s) 1930 and the CU 1910 to be implemented in a cloud-based RAN architecture, such as a vRAN architecture.

The SMO Framework 1905 may be configured to support RAN deployment and provisioning of non-virtualized and virtualized network elements. For non-virtualized network elements, the SMO Framework 1905 may be configured to support the deployment of dedicated physical resources for RAN coverage requirements which may be managed via an operations and maintenance interface (such as an O1 interface). For virtualized network elements, the SMO Framework 1905 may be configured to interact with a cloud computing platform (such as an open cloud (O-Cloud) 1990) to perform network element life cycle management (such as to instantiate virtualized network elements) via a cloud computing platform interface (such as an O2 interface). Such virtualized network elements can include, but are not limited to, CUs 1910, DUs 1930, RUs 1940 and Near-RT RICs 1925. In some implementations, the SMO Framework 1905 can communicate with a hardware aspect of a 4G RAN, such as an open eNB (O-eNB) 1911, via an O1 interface. Additionally, in some implementations, the SMO Framework 1905 can communicate directly with one or more RUs 1940 via an O1 interface. The SMO Framework 1905 also may include a Non-RT RIC 1915 configured to support functionality of the SMO Framework 1905.

The Non-RT RIC 1915 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1925. The Non-RT RIC 1915 may be coupled to or communicate with (such as via an A1 interface) the Near-RT RIC 1925. The Near-RT RIC 1925 may be configured to include a logical function that enables near-real-time control and optimization of RAN elements and resources via data collection and actions over an interface (such as via an E2 interface) connecting one or more CUs 1910, one or more DUs 1930, or both, as well as an O-eNB, with the Near-RT RIC 1925.

In some implementations, to generate AI/ML models to be deployed in the Near-RT RIC 1925, the Non-RT RIC 1915 may receive parameters or external enrichment information from external servers. Such information may be utilized by the Near-RT RIC 1925 and may be received at the SMO Framework 1905 or the Non-RT RIC 1915 from non-network data sources or from network functions. In some examples, the Non-RT RIC 1915 or the Near-RT RIC 1925 may be configured to tune RAN behavior or performance. For example, the Non-RT RIC 1915 may monitor long-term trends and patterns for performance and employ AI/ML models to perform corrective actions through the SMO Framework 1905 (such as reconfiguration via O1) or via creation of RAN management policies (such as A1 policies).

The following provides an overview of aspects of the present disclosure:

Aspect 1: A method for wireless communications at a UE, comprising: receiving, from a network device, control signaling indicating parameters for a phase tracking reference signal configuration for a downlink shared channel reception, the parameters indicating to the UE that the phase tracking reference signal configuration omits a phase tracking reference signal based at least in part on a capability of the UE to apply blind common phase error mitigation for downlink shared channel receptions; and receiving, from the network device, control information scheduling a downlink shared channel allocation without a phase tracking reference signal.

Aspect 2: The method of aspect 1, wherein receiving the control signaling comprises: receiving the control signaling via a radio resource control message.

Aspect 3: The method of any of aspects 1 through 2, further comprising: receiving a downlink shared channel message in the downlink shared channel allocation in accordance with the parameters.

Aspect 4: The method of aspect 3, wherein receiving the downlink shared channel message comprises: receiving the downlink shared channel message conveyed by the downlink shared channel allocation based at least in part on applying the blind common phase error mitigation as a part of a downlink shared channel allocation demodulation process.

Aspect 5: The method of aspect 4, wherein applying the blind common phase error mitigation comprises: determining a blind common phase error estimation; and applying a blind common phase error correction based at least in part on the blind common phase error estimation.

Aspect 6: The method of aspect 5, further comprising: receiving, with the control information, scheduling information for a set of downlink shared channel allocations associated with a set of component carriers and without a phase tracking reference signal, wherein the downlink shared channel allocation is associated with a first component carrier; and receiving a set of downlink shared channel messages transmitted simultaneously with the downlink shared channel message via the set of downlink shared channel allocations associated with the set of component carriers based at least in part on the determined blind common phase error estimation for the downlink shared channel message.

Aspect 7: The method of any of aspects 3 through 6, wherein receiving the downlink shared channel message comprises: receiving a plurality of orthogonal frequency-division multiplexing symbols in the downlink shared channel allocation comprising a single demodulation reference signal and a set of orthogonal frequency-division multiplexing data symbols.

Aspect 8: The method of aspect 7, wherein receiving the downlink shared channel message further comprises: applying a first common phase error mitigation to a first orthogonal frequency-division multiplexing data symbol of the set of orthogonal frequency-division multiplexing data symbols, wherein the first orthogonal frequency-division multiplexing data symbol comprises a nearest orthogonal frequency-division multiplexing data symbol to the single demodulation reference signal; and demodulating the first orthogonal frequency-division multiplexing data symbol of the set of orthogonal frequency-division multiplexing data symbols based at least in part on the first common phase error mitigation.

Aspect 9: The method of aspect 8, wherein receiving the downlink shared channel message further comprises: applying a second common phase error mitigation to a second orthogonal frequency-division multiplexing data symbol of the set of orthogonal frequency-division multiplexing data symbols based at least in part on a common phase error estimation of the first orthogonal frequency-division multiplexing data symbol, the second orthogonal frequency-division multiplexing data symbol adjacent in time to the first orthogonal frequency-division multiplexing data symbol; and demodulating the second orthogonal frequency-division multiplexing data symbol of the set of orthogonal frequency-division multiplexing data symbols based at least in part on the second common phase error mitigation.

Aspect 10: The method of any of aspects 7 through 9, wherein receiving the downlink shared channel message further comprises: receiving the plurality of orthogonal frequency-division multiplexing symbols in the downlink shared channel allocation with an unknown residual carrier frequency offset.

Aspect 11: The method of aspect 10, wherein the downlink shared channel message comprises one of a frequency range one cellular cell message or a frequency range two or above cellular cell message.

Aspect 12: The method of any of aspects 3 through 11, wherein the downlink shared channel message comprises a frequency range two or above cellular message.

Aspect 13: The method of any of aspects 1 through 12, further comprising: transmitting, to the network device, a control message indicating the capability of the UE to apply blind common phase error estimation.

Aspect 14: The method of aspect 13, wherein transmitting the control message comprises: transmitting, with the control message, a first indication of one or more phase tracking reference signal related modulation and coding scheme threshold indices for the downlink shared channel allocation and a second indication of one or more phase tracking reference signal related bandwidth thresholds for the downlink shared channel allocation.

Aspect 15: A method for wireless communications at a network device, comprising: transmitting, to a UE, control information scheduling an uplink shared channel allocation for transmitting an uplink shared channel message; transmitting, to the UE, control signaling indicating to omit transmission of a phase tracking reference signal in the uplink shared channel allocation; and receiving the uplink shared channel message in the uplink shared channel allocation in accordance with a phase tracking reference signal configuration that omits a phase tracking reference signal based at least in part on a capability of the network device to apply blind common phase error mitigation for uplink shared channel receptions.

Aspect 16: The method of aspect 15, wherein receiving the uplink shared channel message comprises: receiving the uplink shared channel message conveyed by the uplink shared channel allocation based at least in part on applying the blind common phase error mitigation as a part of an uplink shared channel allocation demodulation process.

Aspect 17: The method of aspect 16, wherein applying the blind common phase error mitigation comprises: determining a blind common phase error estimation; and applying a blind common phase error correction based at least in part on the blind common phase error estimation.

Aspect 18: The method of aspect 17, further comprising: transmitting, with the control information, scheduling information for a set of uplink shared channel allocations associated with a set of component carriers and without a phase tracking reference signal, wherein the uplink shared channel allocation is associated with a first component carrier; and receiving a set of uplink shared channel messages transmitted simultaneously with the uplink shared channel message via the set of uplink shared channel allocations associated with the set of component carriers based at least in part on the determined blind common phase error estimation for the uplink shared channel message.

Aspect 19: The method of any of aspects 15 through 18, wherein receiving the uplink shared channel message comprises: receiving a plurality of orthogonal frequency-division multiplexing symbols in the uplink shared channel allocation comprising a single demodulation reference signal and a set of orthogonal frequency-division multiplexing data symbols.

Aspect 20: The method of aspect 19, wherein receiving the uplink shared channel message further comprises: applying a first common phase error mitigation to a first orthogonal frequency-division multiplexing data symbol of the set of orthogonal frequency-division multiplexing data symbols, wherein the first orthogonal frequency-division multiplexing data symbol comprises a nearest orthogonal frequency-division multiplexing data symbol to the single demodulation reference signal; and demodulating the first orthogonal frequency-division multiplexing data symbol of the set of orthogonal frequency-division multiplexing data symbols based at least in part on the first common phase error mitigation.

Aspect 21: The method of aspect 20, wherein receiving the uplink shared channel message further comprises: applying a second common phase error mitigation to a second orthogonal frequency-division multiplexing data symbol of the set of orthogonal frequency-division multiplexing data symbols based at least in part on the first common phase error mitigation of the first orthogonal frequency-division multiplexing data symbol, the second orthogonal frequency-division multiplexing data symbol adjacent in time to the first orthogonal frequency-division multiplexing data symbol; and demodulating the second orthogonal frequency-division multiplexing data symbol of the set of orthogonal frequency-division multiplexing data symbols based at least in part on the second common phase error mitigation.

Aspect 22: The method of any of aspects 19 through 21, wherein receiving the uplink shared channel message further comprises: receiving the plurality of orthogonal frequency-division multiplexing symbols in the uplink shared channel allocation with an unknown carrier frequency offset.

Aspect 23: The method of aspect 22, wherein the uplink shared channel message comprises one of a frequency range one cellular cell message or a frequency range two or above cellular cell message.

Aspect 24: The method of any of aspects 15 through 23, wherein the uplink shared channel message comprises a frequency range two or above cellular message.

Aspect 25: An apparatus for wireless communications at a UE, comprising a processor; memory coupled with the processor; and instructions stored in the memory and executable by the processor to cause the apparatus to perform a method of any of aspects 1 through 14.

Aspect 26: An apparatus for wireless communications at a UE, comprising at least one means for performing a method of any of aspects 1 through 14.

Aspect 27: A non-transitory computer-readable medium storing code for wireless communications at a UE, the code comprising instructions executable by a processor to perform a method of any of aspects 1 through 14.

Aspect 28: An apparatus for wireless communications at a network device, comprising a processor; memory coupled with the processor; and instructions stored in the memory and executable by the processor to cause the apparatus to perform a method of any of aspects 15 through 24.

Aspect 29: An apparatus for wireless communications at a network device, comprising at least one means for performing a method of any of aspects 15 through 24.

Aspect 30: A non-transitory computer-readable medium storing code for wireless communications at a network device, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, control signaling indicating parameters for a phase tracking reference signal configuration for a downlink shared channel reception, the parameters indicating to the UE that the phase tracking reference signal configuration omits a phase tracking reference signal based at least in part on a capability of the UE to apply blind common phase error mitigation for downlink shared channel receptions; and
   receiving, from the network device, control information scheduling a downlink shared channel allocation without a phase tracking reference signal.

2. The method of claim 1, wherein receiving the control signaling comprises:
   receiving the control signaling via a radio resource control message.

3. The method of claim 1, further comprising:
   receiving a downlink shared channel message in the downlink shared channel allocation in accordance with the parameters.

4. The method of claim 3, wherein receiving the downlink shared channel message comprises:
   receiving the downlink shared channel message conveyed by the downlink shared channel allocation based at least in part on applying the blind common phase error mitigation as a part of a downlink shared channel allocation demodulation process.

5. The method of claim 4, wherein applying the blind common phase error mitigation comprises:
   determining a blind common phase error estimation; and
   applying a blind common phase error correction based at least in part on the blind common phase error estimation.

6. The method of claim 5, further comprising:
   receiving, with the control information, scheduling information for a set of downlink shared channel allocations associated with a set of component carriers and without a phase tracking reference signal, wherein the downlink shared channel allocation is associated with a first component carrier; and
   receiving a set of downlink shared channel messages transmitted simultaneously with the downlink shared channel message via the set of downlink shared channel allocations associated with the set of component carriers based at least in part on the determined blind common phase error estimation for the downlink shared channel message.

7. The method of claim 3, wherein receiving the downlink shared channel message comprises:
   receiving a plurality of orthogonal frequency-division multiplexing symbols in the downlink shared channel allocation comprising a single demodulation reference signal and a set of orthogonal frequency-division multiplexing data symbols.

8. The method of claim 7, wherein receiving the downlink shared channel message further comprises:
   applying a first common phase error mitigation to a first orthogonal frequency-division multiplexing data symbol of the set of orthogonal frequency-division multiplexing data symbols, wherein the first orthogonal frequency-division multiplexing data symbol comprises a nearest orthogonal frequency-division multiplexing data symbol to the single demodulation reference signal; and
   demodulating the first orthogonal frequency-division multiplexing data symbol of the set of orthogonal frequency-division multiplexing data symbols based at least in part on the first common phase error mitigation.

9. The method of claim 8, wherein receiving the downlink shared channel message further comprises:
   applying a second common phase error mitigation to a second orthogonal frequency-division multiplexing data symbol of the set of orthogonal frequency-division multiplexing data symbols based at least in part on a common phase error estimation of the first orthogonal frequency-division multiplexing data symbol, the second orthogonal frequency-division multiplexing data symbol adjacent in time to the first orthogonal frequency-division multiplexing data symbol; and
   demodulating the second orthogonal frequency-division multiplexing data symbol of the set of orthogonal frequency-division multiplexing data symbols based at least in part on the second common phase error mitigation.

10. The method of claim 7, wherein receiving the downlink shared channel message further comprises:
    receiving the plurality of orthogonal frequency-division multiplexing symbols in the downlink shared channel allocation with an unknown residual carrier frequency offset.

11. The method of claim 10, wherein the downlink shared channel message comprises one of a frequency range one cellular cell message or a frequency range two or above cellular cell message.

12. The method of claim 3, wherein the downlink shared channel message comprises a frequency range two or above cellular message.

13. The method of claim 1, further comprising:
    transmitting, to the network device, a control message indicating the capability of the UE to apply blind common phase error estimation.

14. The method of claim 13, wherein transmitting the control message comprises:
    transmitting, with the control message, a first indication of one or more phase tracking reference signal related modulation and coding scheme threshold indices for the downlink shared channel allocation and a second indication of one or more phase tracking reference signal related bandwidth thresholds for the downlink shared channel allocation.

15. A method for wireless communications at a network device, comprising:
    transmitting, to a user equipment (UE), control information scheduling an uplink shared channel allocation for transmitting an uplink shared channel message;
    transmitting, to the UE, control signaling indicating to omit transmission of a phase tracking reference signal in the uplink shared channel allocation; and receiving the uplink shared channel message in the uplink shared channel allocation in accordance with a phase tracking reference signal configuration that omits a phase tracking reference signal based at least in part on a capability of the network device to apply blind common phase error mitigation for uplink shared channel receptions.

16. The method of claim 15, wherein receiving the uplink shared channel message comprises:
receiving the uplink shared channel message conveyed by the uplink shared channel allocation based at least in part on applying the blind common phase error mitigation as a part of an uplink k shared channel allocation demodulation process.

17. The method of claim 16, wherein applying the blind common phase error mitigation comprises:
determining a blind common phase error estimation; and
applying a blind common phase error correction based at least in part on the blind common phase error estimation.

18. The method of claim 17, further comprising:
transmitting, with the control information, scheduling information for a set of uplink shared channel allocations associated with a set of component carriers and without a phase tracking reference signal, wherein the uplink shared channel allocation is associated with a first component carrier; and
receiving a set of uplink shared channel messages transmitted simultaneously with the uplink shared channel message via the set of uplink shared channel allocations associated with the set of component carriers based at least in part on the determined blind common phase error estimation for the uplink shared channel message.

19. The method of claim 15, wherein receiving the uplink shared channel message comprises:
receiving a plurality of orthogonal frequency-division multiplexing symbols in the uplink shared channel allocation comprising a single demodulation reference signal and a set of orthogonal frequency-division multiplexing data symbols.

20. The method of claim 19, wherein receiving the uplink shared channel message further comprises:
applying a first common phase error mitigation to a first orthogonal frequency-division multiplexing data symbol of the set of orthogonal frequency-division multiplexing data symbols, wherein the first orthogonal frequency-division multiplexing data symbol comprises a nearest orthogonal frequency-division multiplexing data symbol to the single demodulation reference signal; and
demodulating the first orthogonal frequency-division multiplexing data symbol of the set of orthogonal frequency-division multiplexing data symbols based at least in part on the first common phase error mitigation.

21. The method of claim 20, wherein receiving the uplink shared channel message further comprises:
applying a second common phase error mitigation to a second orthogonal frequency-division multiplexing data symbol of the set of orthogonal frequency-division multiplexing data symbols based at least in part on the first common phase error mitigation of the first orthogonal frequency-division multiplexing data symbol, the second orthogonal frequency-division multiplexing data symbol adjacent in time to the first orthogonal frequency-division multiplexing data symbol; and demodulating the second orthogonal frequency-division multiplexing data symbol of the set of orthogonal frequency-division multiplexing data symbols based at least in part on the second common phase error mitigation.

22. The method of claim 19, wherein receiving the uplink shared channel message further comprises:
receiving the plurality of orthogonal frequency-division multiplexing symbols in the uplink shared channel allocation with an unknown carrier frequency offset.

23. The method of claim 22, wherein the uplink shared channel message comprises one of a frequency range one cellular cell message or a frequency range two or above cellular cell message.

24. The method of claim 15, wherein the uplink shared channel message comprises a frequency range two or above cellular message.

25. An apparatus for wireless communications at a user equipment (UE), comprising:
a processor;
memory coupled with the processor; and
instructions stored in the memory and executable by the processor to cause the apparatus to:
receive, from a network device, control signaling indicating parameters for a phase tracking reference signal configuration for a downlink shared channel reception, the parameters indicating to the UE that the phase tracking reference signal configuration omits a phase tracking reference signal based at least in part on a capability of the UE to apply blind common phase error mitigation for downlink shared channel receptions; and
receive, from the network device, control information scheduling a downlink shared channel allocation without a phase tracking reference signal.

26. The apparatus of claim 25, wherein the instructions to receive the control signaling are executable by the processor to cause the apparatus to:
receive the control signaling via a radio resource control message.

27. The apparatus of claim 25, wherein the instructions are further executable by the processor to cause the apparatus to:
receive a downlink shared channel message in the downlink shared channel allocation in accordance with the parameters.

28. The apparatus of claim 27, wherein the instructions to receive the downlink shared channel message are executable by the processor to cause the apparatus to:
receive the downlink shared channel message conveyed by the downlink shared channel allocation based at least in part on applying the blind common phase error mitigation as a part of a downlink shared channel allocation demodulation process.

29. The apparatus of claim 28, wherein the instructions to apply the blind common phase error mitigation are executable by the processor to cause the apparatus to:
determine a blind common phase error estimation; and
apply a blind common phase error correction based at least in part on the blind common phase error estimation.

30. An apparatus for wireless communications at a network device, comprising:
a processor;
memory coupled with the processor; and
instructions stored in the memory and executable by the processor to cause the apparatus to:

transmit, to a user equipment (UE), control information scheduling an uplink shared channel allocation for transmitting an uplink shared channel message;

transmit, to the UE, control signaling indicating to omit transmission of a phase tracking reference signal in the uplink shared channel allocation; and receive the uplink shared channel message in the uplink shared channel allocation in accordance with a phase tracking reference signal configuration that omits a phase tracking reference signal based at least in part on a capability of the network device to apply blind common phase error mitigation for uplink shared channel receptions.

\* \* \* \* \*